US008494061B2

(12) United States Patent
Henocq et al.

(10) Patent No.: US 8,494,061 B2
(45) Date of Patent: Jul. 23, 2013

(54) METHODS AND DEVICES FOR RE-SYNCHRONIZING A DAMAGED VIDEO STREAM

(75) Inventors: Xavier Henocq, Melesse (FR); Thomas Ronan, Paimpont (FR); Herve Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1291 days.

(21) Appl. No.: 11/959,145

(22) Filed: Dec. 18, 2007

(65) Prior Publication Data
US 2008/0144725 A1 Jun. 19, 2008

(30) Foreign Application Priority Data

Dec. 19, 2006 (FR) ...................................... 06 55646
Sep. 27, 2007 (FR) ...................................... 07 57905

(51) Int. Cl.
*H04N 7/12* (2006.01)
(52) U.S. Cl.
USPC .................................................. 375/240.27
(58) Field of Classification Search
USPC .................................................. 375/240.27
See application file for complete search history.

(56) References Cited

U.S. PATENT DOCUMENTS

| | | | | |
|---|---|---|---|---|
| 4,704,628 | A * | 11/1987 | Chen et al. ................. | 348/400.1 |
| 5,528,284 | A | 6/1996 | Iwami et al. .................... | 348/13 |
| 6,683,988 | B1 | 1/2004 | Fukunaga et al. ............ | 382/236 |
| 6,697,126 | B2 | 2/2004 | Moni et al. ..................... | 348/616 |
| 7,058,200 | B2 | 6/2006 | Donescu et al. .............. | 382/100 |
| 2002/0013903 | A1 | 1/2002 | Le Floch ........................ | 713/176 |
| 2002/0109787 | A1 | 8/2002 | Moni et al. .................... | 348/616 |
| 2003/0169815 | A1 * | 9/2003 | Aggarwal et al. ......... | 375/240.12 |
| 2004/0006644 | A1 | 1/2004 | Henocq et al. ................ | 709/246 |
| 2004/0066853 | A1 * | 4/2004 | Chen et al. ............... | 375/240.27 |
| 2004/0184529 | A1 | 9/2004 | Henocq et al. ............ | 375/240.01 |
| 2005/0111743 | A1 * | 5/2005 | Kong et al. .................... | 382/236 |
| 2005/0157720 | A1 * | 7/2005 | Chandhok et al. ............ | 370/390 |
| 2005/0220192 | A1 * | 10/2005 | Huang et al. ............. | 375/240.16 |
| 2006/0056519 | A1 * | 3/2006 | Horowitz et al. ........ | 375/240.27 |
| 2006/0256867 | A1 * | 11/2006 | Turaga et al. ............ | 375/240.16 |
| 2006/0285589 | A1 * | 12/2006 | Hannuksela ............. | 375/240.12 |
| 2007/0110391 | A1 * | 5/2007 | MacInnis ........................ | 386/68 |
| 2007/0121721 | A1 * | 5/2007 | Kim et al. ................ | 375/240.08 |

(Continued)

OTHER PUBLICATIONS

Harmanci, O. et al.,: "A Zero Error Propagation Extension to H264 for Low Delay Video Communications Over Lossy Channels", Acoutstics, Speech, and Signal Processing, 2005, IEEE International Conference on Philadelphia, pp. 185-188, Mar. 18, 2005.

*Primary Examiner* — Mark Rinehart
*Assistant Examiner* — Christopher R Crompton
(74) *Attorney, Agent, or Firm* — Fitzpatrick, Cella, Harper & Scinto

(57) ABSTRACT

The invention concerns methods and devices for concealing artefacts induced by transmission errors in a video sequence transmitted over a network between a server and a client making it possible to avoid abrupt resynchronization following a transmission error. When an error is detected, a video stream is created from a first video stream not containing any error and data representing artefacts induced by that error. The influence of the data representing the artefacts diminishes with time such that the created video stream converges towards the video stream not containing any error. The creation of the video stream in which the effects due to a transmission error are progressively removed may be carried out by the server or by the client.

37 Claims, 16 Drawing Sheets

U.S. PATENT DOCUMENTS

| | | |
|---|---|---|
| 2007/0127576 A1 | 6/2007 | Henocq et al. ............ 375/240.16 |
| 2007/0195880 A1 | 8/2007 | Henocq et al. ............ 275/240.13 |
| 2007/0286508 A1 | 12/2007 | Le Leannec et al. ......... 382/240 |
| 2008/0025399 A1 | 1/2008 | Le Leannec et al. .... 375/240.16 |
| 2008/0075170 A1 | 3/2008 | Henocq et al. ............ 375/240.16 |
| 2008/0095231 A1 | 4/2008 | Onno et al. ............... 375/240.12 |
| 2008/0130736 A1 | 6/2008 | Onno et al. ............... 375/240.01 |
| 2008/0130739 A1 | 6/2008 | Le Floch et al. ......... 375/240.01 |
| 2009/0052543 A1* | 2/2009 | Wu et al. .................. 375/240.24 |
| 2012/0201301 A1* | 8/2012 | Bao et al. ................. 375/240.14 |

* cited by examiner

METHODS AND DEVICES FOR RE-SYNCHRONIZING A DAMAGED VIDEO STREAM

The present invention concerns the transmission of a multimedia content from a source to one or more recipients over an unreliable network and more particularly methods and devices for re-synchronizing a damaged video stream.

The systems for transmitting a multimedia content from a source to one or more recipients over an unreliable network consist in general of a server and one or more clients. FIG. 1 depicts schematically a distributed data exchange network. Such a network comprises a set of client terminals and/or servers, each terminal being connected to the network and having communication means. The network may for example be a wireless network such as a WiFi network (802.11a or b or g), an Ethernet network or the Internet. The server 100 consists in particular of a video acquisition or storage system, a coder and a network module. The client 105 consist in particular of a decoder and a network module. Each terminal 100 and 105 preferably comprises a volatile storage memory 110 (cache memory), a file server 115 and a man/machine interface 120 that affords communication of the requests from the user. The terminals can communicate directly by means of the global network 125.

Coding is generally based on video standards using various types of video compression. The video compression methods can be distinguished in two classes: so called "Intra" or spatial methods that reduce the spatial redundancy within a frame and so called "Inter" methods, or hybrid coding, mixing the reduction of spatial redundancies and of temporal redundancies. A video stream of the Inter type consists mainly of temporally predicted frames (P or B frames), but also Intra frames (I frames) independent of all other frames. In terms of compression, P and B frames are very much smaller than I frames. They better meet the bandwidth constraints characterizing the networks. Inserting I frames makes it possible to increase the resistance to packet losses and to transmission errors since they cut temporal dependencies. Error propagation phenomena are thus reduced.

The network module of the server is responsible for putting the video stream into packets and transmitting these packets at a rate principally defined by the state of the network and the capacities and requirements of the client. The receiver receives and decodes the successive frames of the video and displays them whilst continuing to receive the following packets.

A simple method for managing transmission errors is to retransmit the lost or erroneous packets. The ARQ algorithm is an example of such a method. However, the delays caused by this method are generally too great for "real time" applications such as video conferencing.

Another method consists of introducing redundancy in the video streams in the form of error correction codes or degraded versions of the original data. The FEC (acronym for Forward Error Correction) system thus makes it possible to correct transmission errors. The problem inherent in this type of tool lies in the effective adjustment of the redundancy level, sufficient for correcting losses but limited in order to maximize the proportion of useful data.

When the mechanisms for error correction by re-transmission (ARQ) or by insertion of redundancy (FEC) are not capable of correcting all the transmission errors, or when such mechanisms are not implemented, the transmission errors which remain induce decoding errors, also termed artefacts, visible in the decoded video stream. These decoding errors may propagate from one image to another due to the predictive coding used.

For this reason, the majority of systems using Inter coding perform by default a refreshing (or a re-synchronization) of the stream by periodically inserting an Intra frame capable of ending any error propagation. However, since Intra frames have a coding cost very much greater than that of Inter frames, the frequency of these frames must be reduced in order not to excessively increase the rate. Moreover, packet acknowledgement mechanisms may indicate to the server the loss of a packet and cause the explicit sending of an Intra frame in order to stop any error propagation on the video stream of the client (also termed refresh on demand or intra refresh).

Transmission error correction mechanisms are often supplemented by decoding error concealment methods for interpolating regions of the frame that have been damaged by losses. These methods have the advantage of not costing anything in terms of network resources (volume and delay). Their implementation is based in fact only on the information and data present on the client. These methods can be based on a spatial interpolation within the same frame by relying on valid regions of the frame for reconstructing the missing data or can be based on a temporal interpolation that uses the data of the previous frames and the estimated motion of the blocks in order to reconstruct the current frame.

Despite these techniques developed for decoding error concealment, it is impossible at present to ensure a perfect reconstruction of the damaged frames of the video, particularly in the case of "real time" applications. This poses a problem of visual comfort for the user.

It should in this regard be noted that the visual quality of a video is difficult to evaluate automatically since such a measurement must meet various psycho-visual criteria that are difficult to quantify. Certain so-called objective measurements such as the measurement of the PSNR (acronym for Peak Signal to Noise Ratio) estimating overall the difference between the original frame and the reconstructed frame are now the reference tool for estimating the quality of reconstruction of a frame.

The U.S. Pat. No. 6,683,988 describes a method relating to loss concealment and to re-synchronization of a video stream. In the event of decoding error on a frame, the decoder indicates the loss to the coder, which will simulate the loss concealment performed on the decoder. The concealment of this loss is therefore performed on the decoder and on the coder, using strictly the same method, thus ensuring that there is the same reference frame on each side of the network. Next, this corrected frame is used as a reference frame at coding level for the following predicted frames. Thus the correction of the data loss is performed automatically with a minimum coding cost and loss in quality of the video.

Even though the decoding error concealment is found to be improved, the visual effect of the concealment is not always sufficiently taken into account.

The U.S. Pat. No. 6,697,126 describes a method for improving the visual rendition of the loss concealment on a damaged frame or video. This method is independent of and complementary to the loss concealment method employed. The method proposes to spatially smooth the transition between the corrected area and the valid part of the frame, preventing any appearance of artificial and possibly abrupt boundaries between these two areas. However, this method does not satisfactorily reduce the visual impact of the correction made on the damaged area.

The invention enables at least one of the problems set forth earlier to be solved.

The invention thus concerns a method of concealment of at least one decoding error induced by at least one transmission error in a multimedia sequence transmitted over a network between a server and a client, the method comprising the following steps, obtaining, further to the detection of said at least one transmission error, what is referred to as a synchronized stream linked to said multimedia sequence, said synchronized stream comprising refresh data;

determining characteristic data of said at least one decoding error; and creating what is referred to as a resulting stream according to a function of said synchronized stream and said characteristic data, the influence of at least one of said characteristic data, in said function, diminishing progressively with time.

The method according to the invention thus makes it possible to reduce the visual impact of a decoding error due to a transmission error, an ineffective correction or a partially effective correction. It is therefore complementary to the correction methods and loss concealment techniques in a video stream.

Advantageously, the influence of said at least one of said characteristic data, in said function, progressively diminishes with time starting with the element of said synchronized stream comprising said refresh data in order to avoid an abrupt transition between an element comprising a decoding error and refreshed data.

According to a particular embodiment, the method further comprises a step of creating what is referred to as a non-synchronized stream linked to said multimedia sequence, said characteristic data being propagated in said non-synchronized stream. The resulting stream may then be created according to a weighted mean of the synchronized and non-synchronized streams.

Still According to a particular embodiment, said multimedia sequence is coded according to a hybrid coding operation of reducing spatial and temporal redundancies, said synchronized stream being based on coded data according to spatial redundancies and said characteristic data being propagated in said non-synchronized stream through coded data according to temporal redundancies.

The invention concerns in particular the distribution of coded video in predictive mode over an unreliable network and videophone, videoconferencing and video on-demand systems for reducing the undesirable effects of error correction and loss concealment, altering the visual quality of the video, whereas it is supposed to improve it.

The invention thus makes it possible to avoid the artificial temporal discontinuity due to the abrupt re-synchronization of the damaged video stream performed following data losses. Despite an overall quantitative reduction in the PSNR, the invention makes it possible to increase the subjective visual quality of the video in the case of data loss.

According to a particular embodiment, said method is implemented in said server, said method also comprising a step of receiving information on the location of said at least one decoding error. Advantageously, the method also comprises a step of propagating said characteristic data according to said received location information.

The invention can be implemented simply at the coder, without modifying the decoder.

Preferably, the creation of said non-synchronized stream is based on reference data, said reference data being determined according to said step of propagating said characteristic data. The method further advantageously comprises steps of coding and transmitting said resulting stream in order to transmit it over a network.

Alternatively, said method may be implemented in said client.

The invention can thus be implemented at the decoder, modifying the coder only in a simple fashion.

The method further advantageously comprises a step of receiving data to propagate said characteristic data.

According to a particular embodiment, reference data are used for determining the data of said non-synchronized stream at a given moment, said reference data being the data of said resulting stream at the previous moment.

Advantageously, the method also comprises a step of concealment of said at least one decoding error in said non-synchronized stream.

The invention can thus be used with any loss concealment method, without degrading the quality and efficacy of the loss concealment module. The invention thus makes the effects and defects and any lack of the error concealment more natural and invisible.

Alternatively, the method further comprises a step of estimating said at least one decoding error, said characteristic data comprising said estimation of said at least one decoding error.

According to this preferred embodiment, the invention is implemented at the decoder without having to modify either the coder or a video server.

Advantageously, said estimation is based on the prediction of an element of said multimedia sequence on the basis of said synchronized stream, said element being, preferably, prior to said at least one transmission error.

According to a particular embodiment, said estimation is obtained by comparison of said predicted element and the corresponding decoded element.

Alternatively, said estimation is based on the prediction of an element of said multimedia sequence, said element comprising said at least one decoding error, on the basis of a decoded element.

According to a particular embodiment, said estimation is obtained by comparison of said predicted element and the corresponding element of said synchronized stream comprising at least one of said refresh data.

Still according to a particular embodiment, the method further comprises a step of evaluating the quality of said prediction in order not to further degrade a part of the multimedia sequence.

Advantageously, said characteristic data comprise an item of information representing the propagation of said at least one decoding error in the multimedia sequence to enable the propagation of the attenuated decoding error.

Said resulting stream is preferably created by transferring said estimation of said at least one decoding error into said synchronized stream, the influence of said estimation of said at least one decoding error diminishing progressively with time. Said estimation of said at least one decoding error is advantageously transferred into only a part of at least one element of said synchronized stream, said part being determined on the basis of said item of information representing the propagation of said at least one decoding error in said multimedia sequence. Thus, only the part affected by the decoding error is modified.

Still according to a particular embodiment, the method comprises a prior step of concealment of said at least one decoding error and a step of evaluating the quality of said concealment, said step of determining characteristic data being implemented only if said estimated quality is less than a predetermined threshold. The method is thus only implemented if the decoding error cannot be satisfactorily concealed.

Said multimedia sequence may comprise, for example, a video sequence, an audio sequence or an audio-video sequence.

The invention also relates to a computer program comprising instructions adapted for the implementation of each of the steps of the method described earlier and an information storage means, removable or not, that is partially or totally readable by a computer or a microprocessor containing code instructions of a computer program for executing each of the steps of the method described earlier.

The invention also concerns a device for concealment of at least one decoding error induced by at least one transmission error in a multimedia sequence transmitted over a network between a server and a client, the device comprising the following means, means for obtaining, further to the detection of said at least one error, what is referred to as a synchronized stream linked to said multimedia sequence, said synchronized stream comprising refresh data;

means for determining characteristic data of said at least one decoding error; and, means for generating what is referred to as a resulting stream according to a function of said synchronized stream and said characteristic data, the influence of at least one of said characteristic data diminishing with time.

The device according to the invention thus makes it possible to reduce the visual impact of an artefact due to a transmission error, an ineffective correction or a partially effective correction. It is therefore complementary to the devices for correction and concealment of losses in a video stream.

According to a particular embodiment, the device further comprises means for creating what is referred to as a non-synchronized stream linked to said multimedia sequence, said characteristic data being propagated in said non-synchronized stream.

Advantageously, said means for generating said synchronized stream comprise a coder. Similarly, said means for generating said non-synchronized stream preferably comprise a decoder.

Advantageously, the device further comprises coding means adapted to code said resulting stream in order to transmit it over a network.

The invention also concerns a server comprising the device described previously.

According to a particular embodiment, said means for generating said synchronized stream of the device according to the invention comprise a decoder.

Still according to a particular embodiment, the device comprises means for receiving two distinct streams in parallel in order to receive said synchronized and non-synchronized streams.

According to a preferred embodiment, the device further comprises means for estimating said at least one decoding error. The invention may thus be implemented at the decoder without having to modify the either coder or the video server.

Advantageously, the device further comprises means for predicting an element of said multimedia sequence, that is prior to the detection of said at least one transmission error, on the basis of said synchronized stream. The device preferably further comprises means for comparing said predicted element and the corresponding decoded element.

Alternatively, the device may comprise means for predicting an element of said multimedia sequence, that is subsequent to the reception of said refresh data, said element comprising said at least one decoding error. Similarly, the device preferably further comprises means for comparing said predicted element and the corresponding element of said synchronized stream.

According to a particular embodiment, the device preferably further comprises means for estimating the quality of said predicted element in order not to further degrade a part of the multimedia sequence.

Still according to a particular embodiment, the device comprises the following means, means for concealment of said at least one decoding error; and, means for evaluating the quality of said concealment.

The means for attenuating the effects of the transmission error are thus only implemented if necessary.

Other advantages, objectives and features of the present invention will emerge from the following detailed description, given by way of non-limiting example, relative to the accompanying drawings in which.

Figure 3:
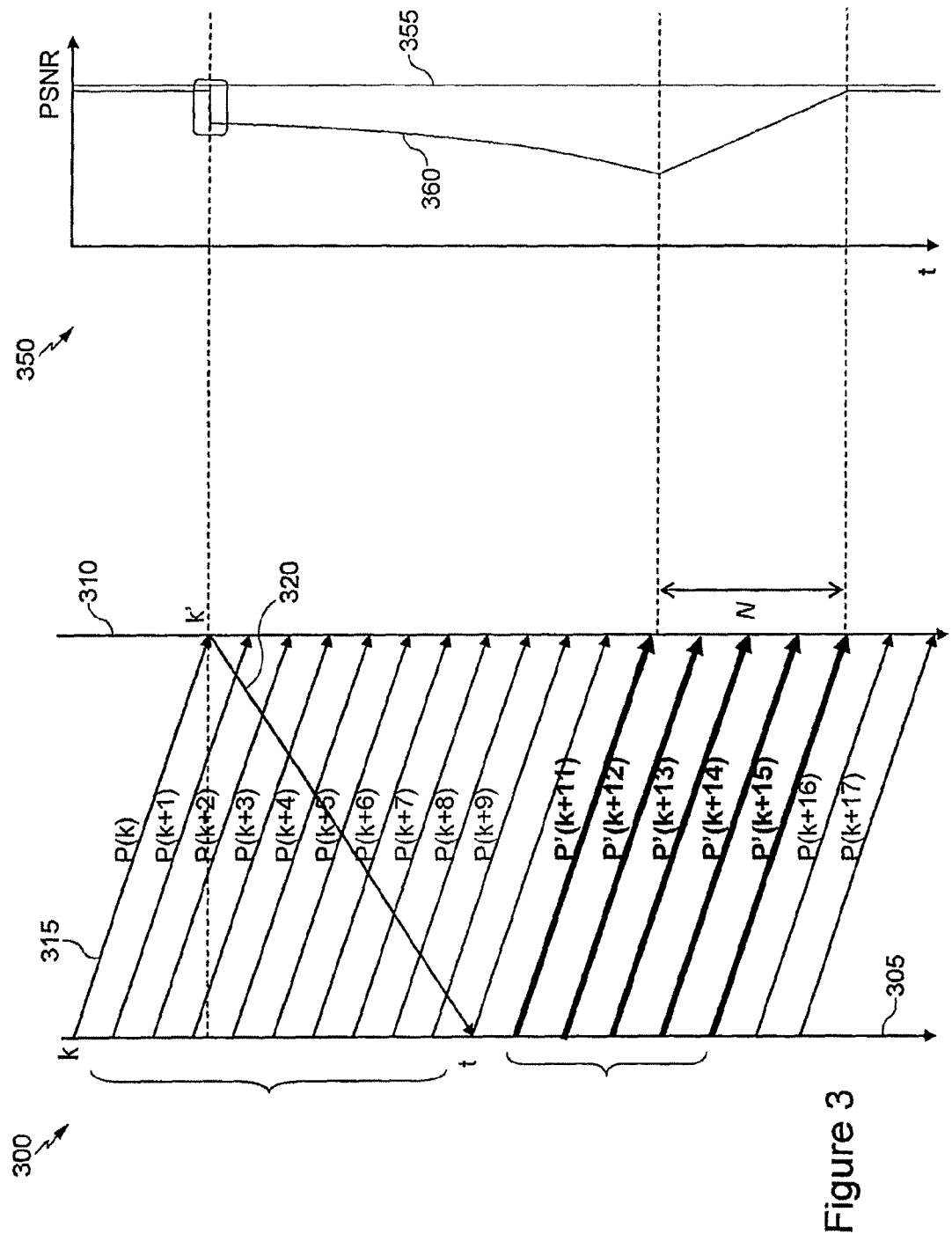
Figure 4:
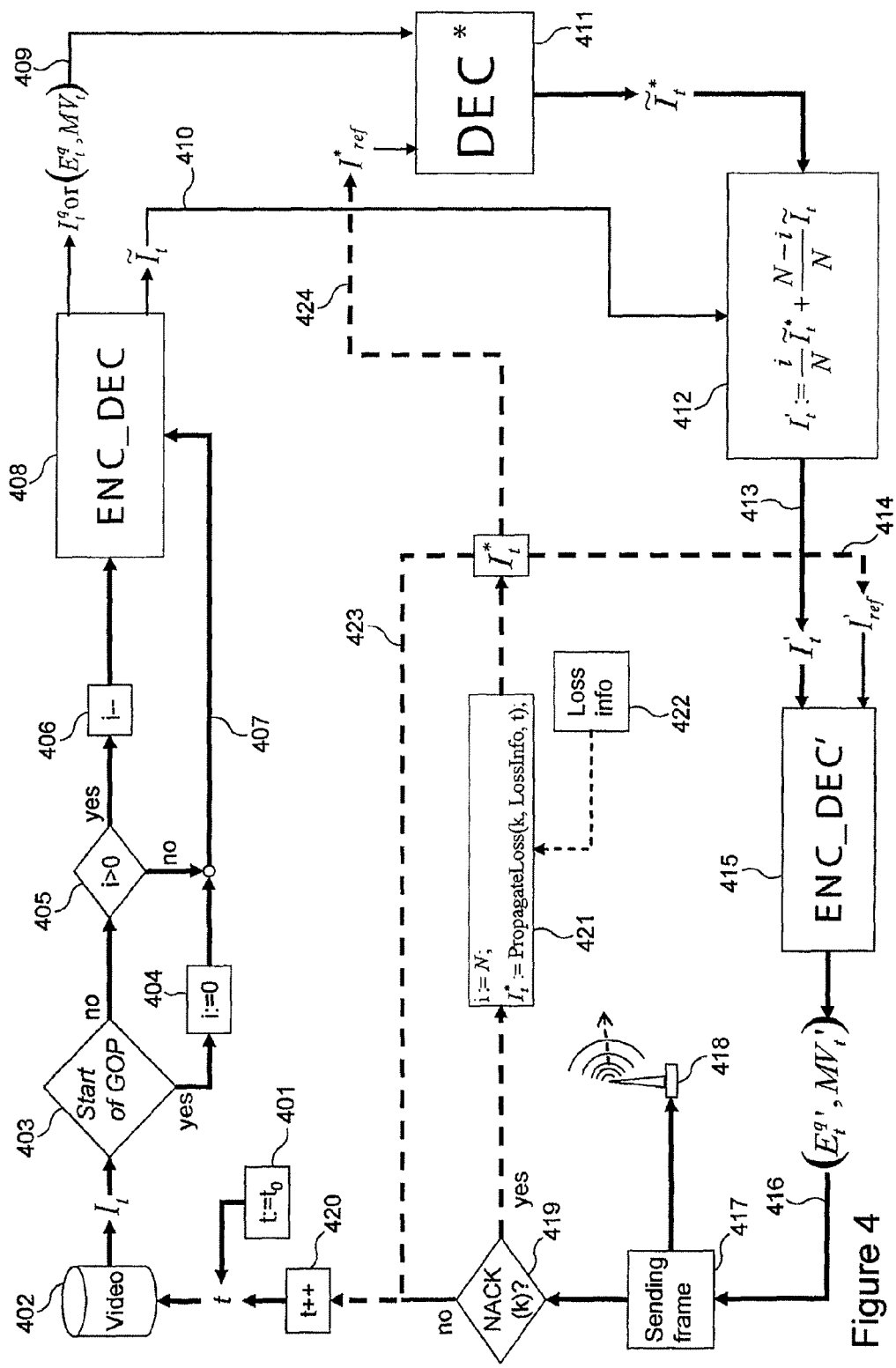
Figure 5:
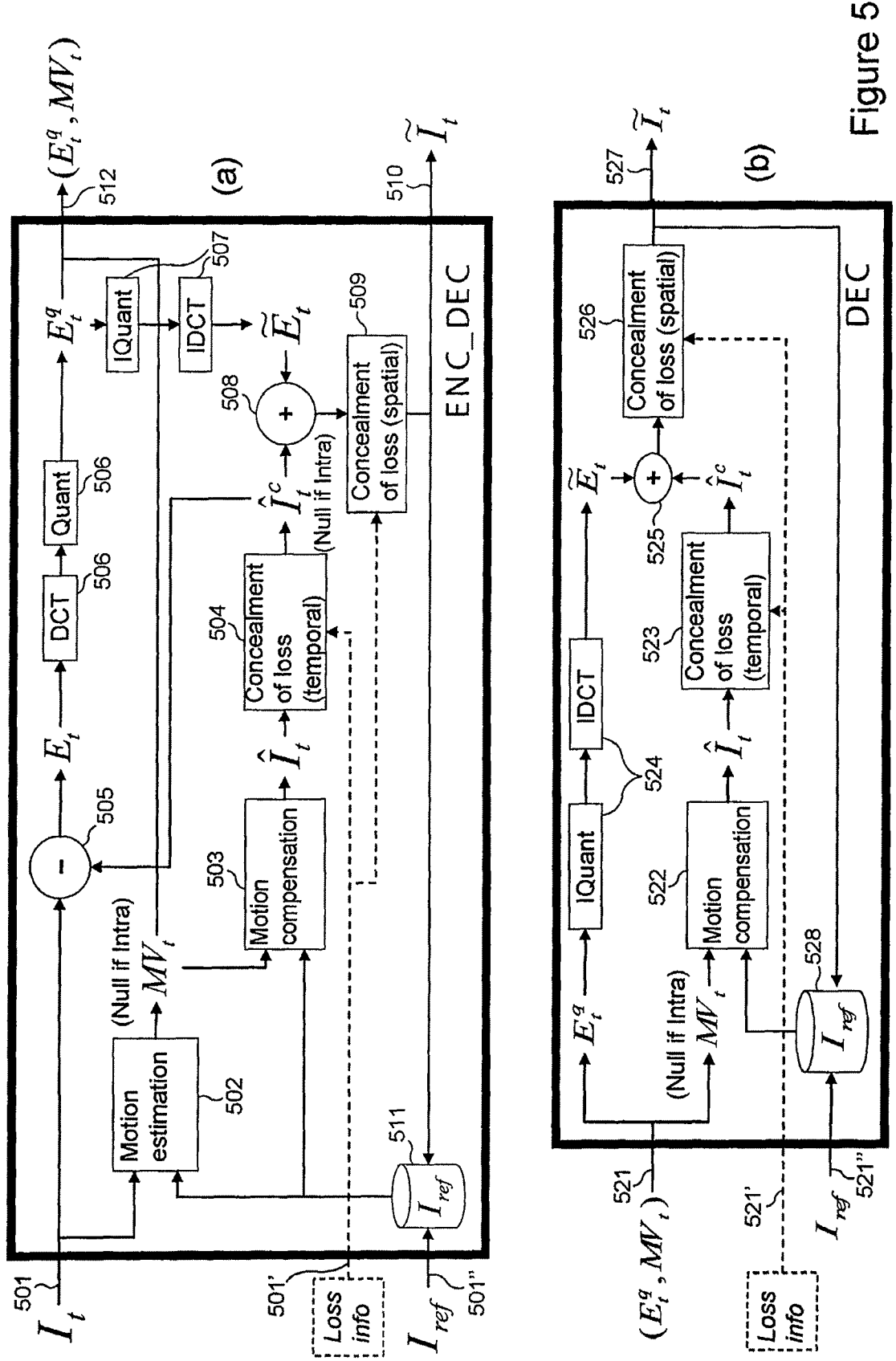
Figure 6:
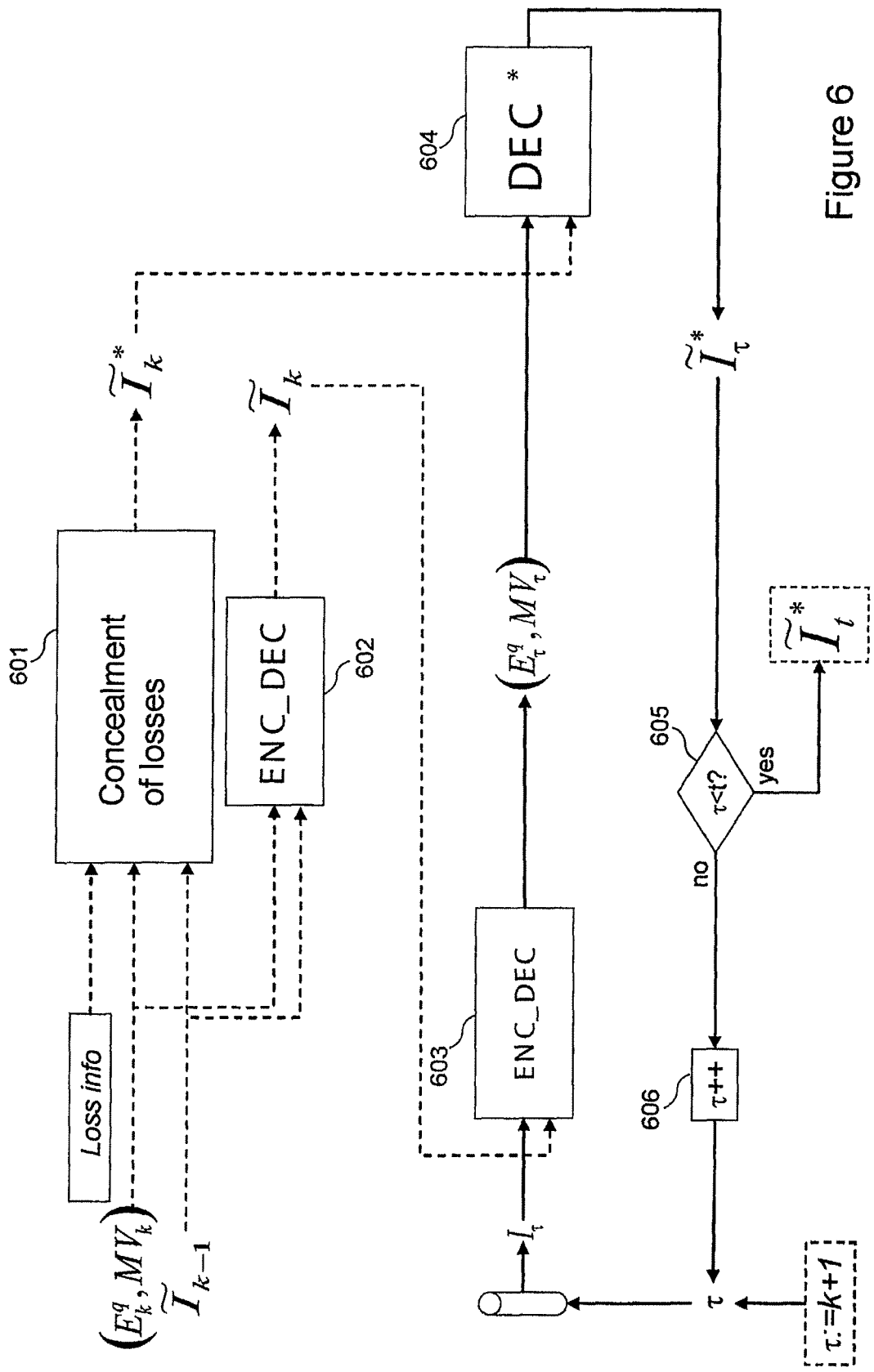
Figure 7:
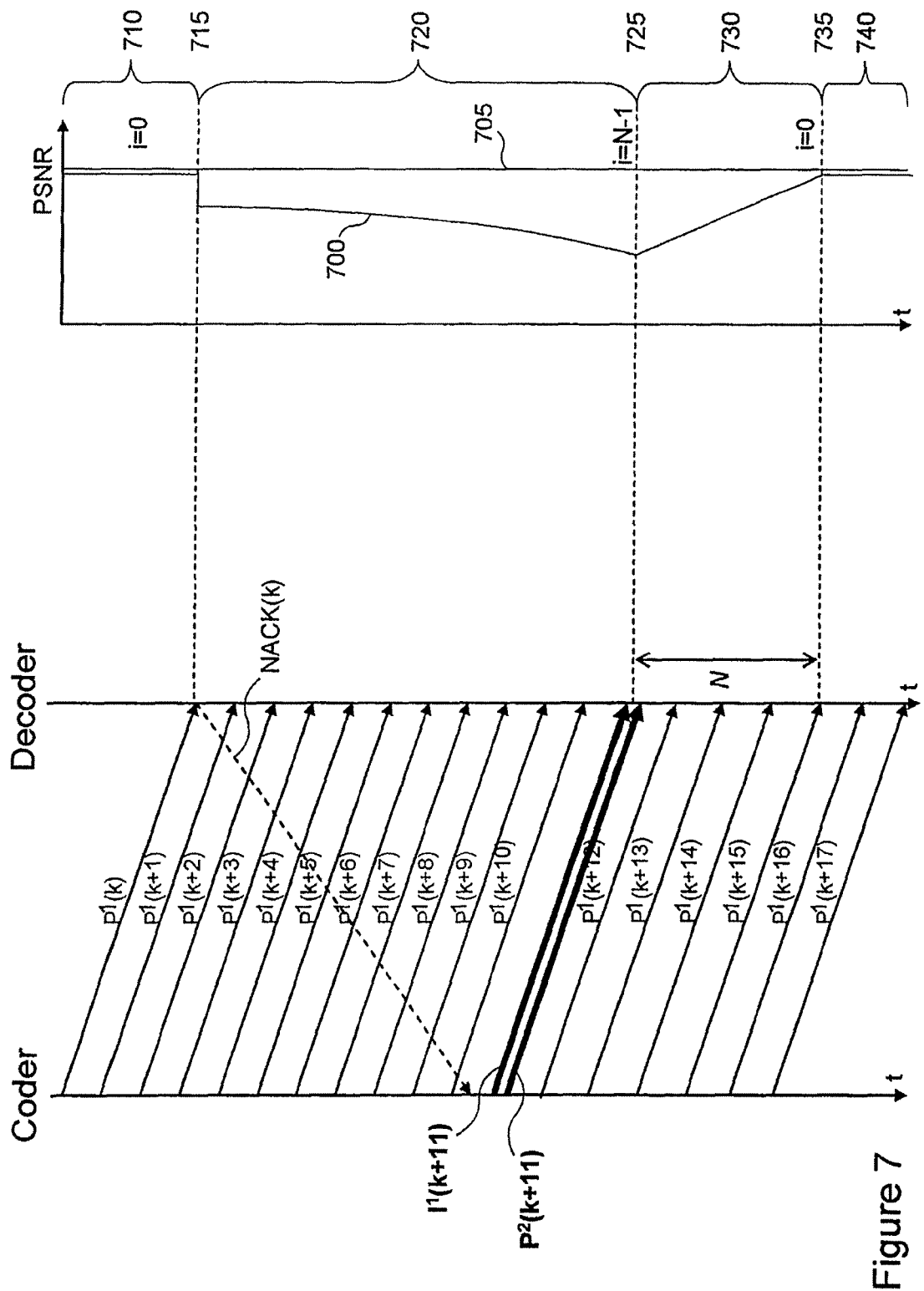
Figure 8:
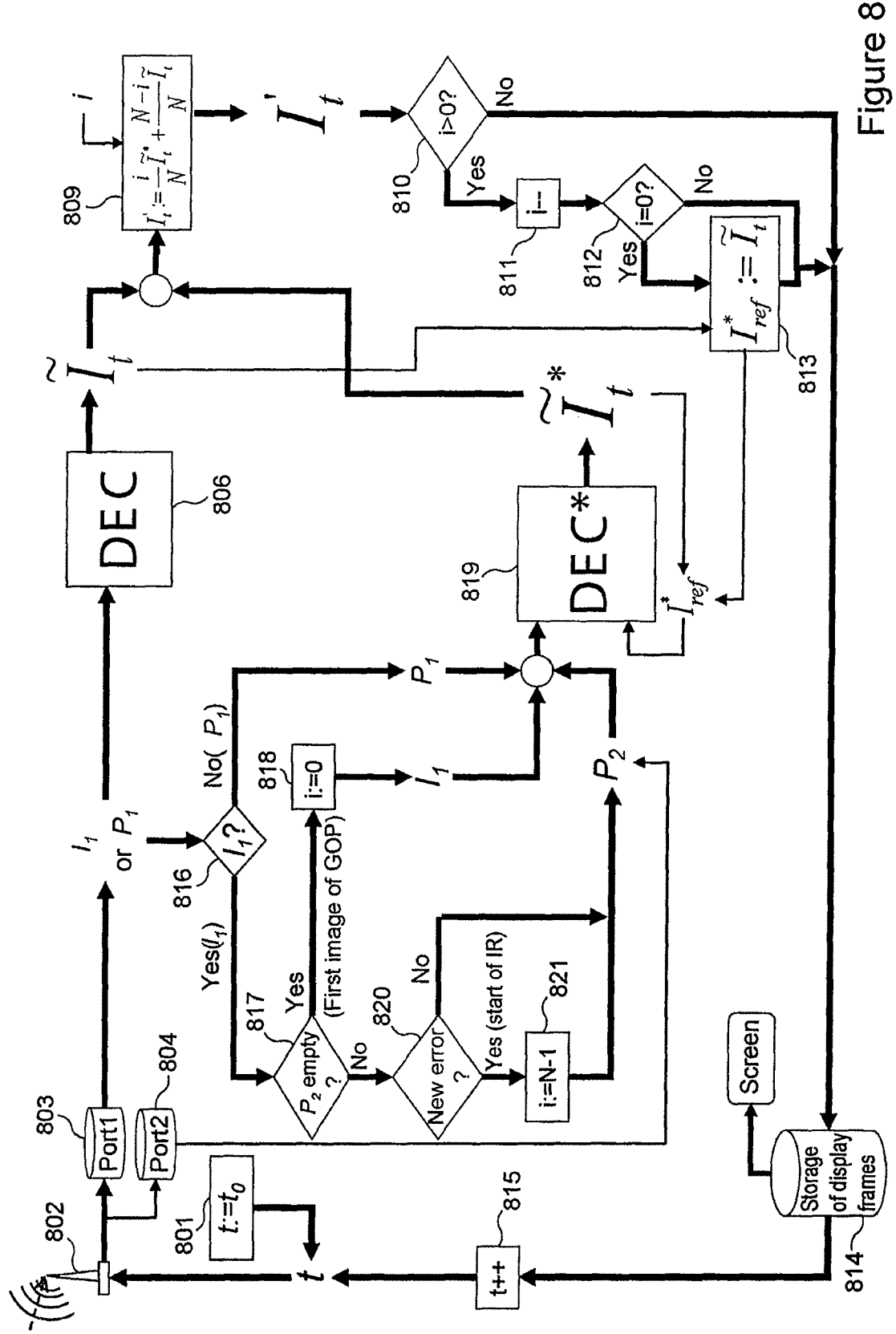
Figure 9:
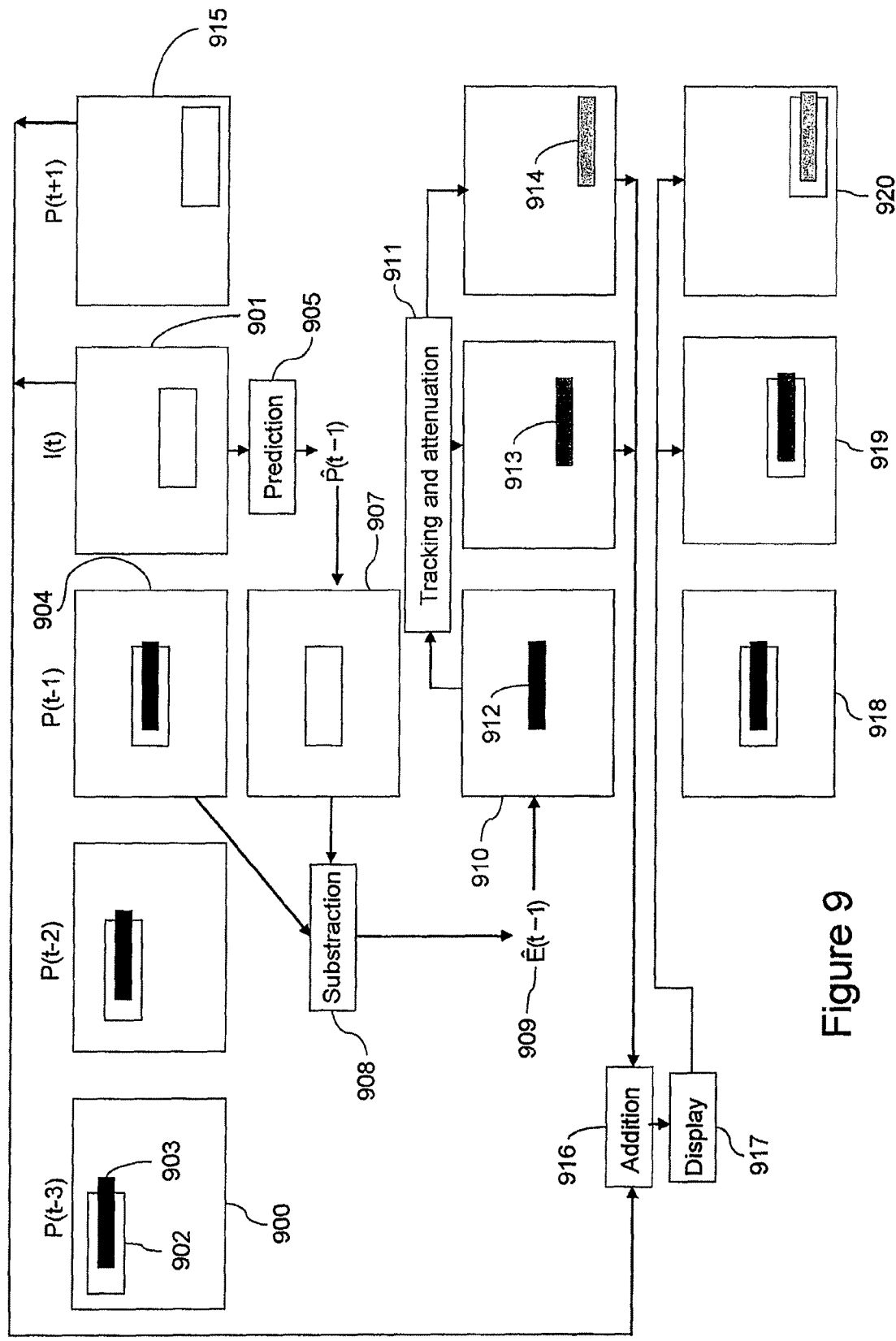
Figure 10:
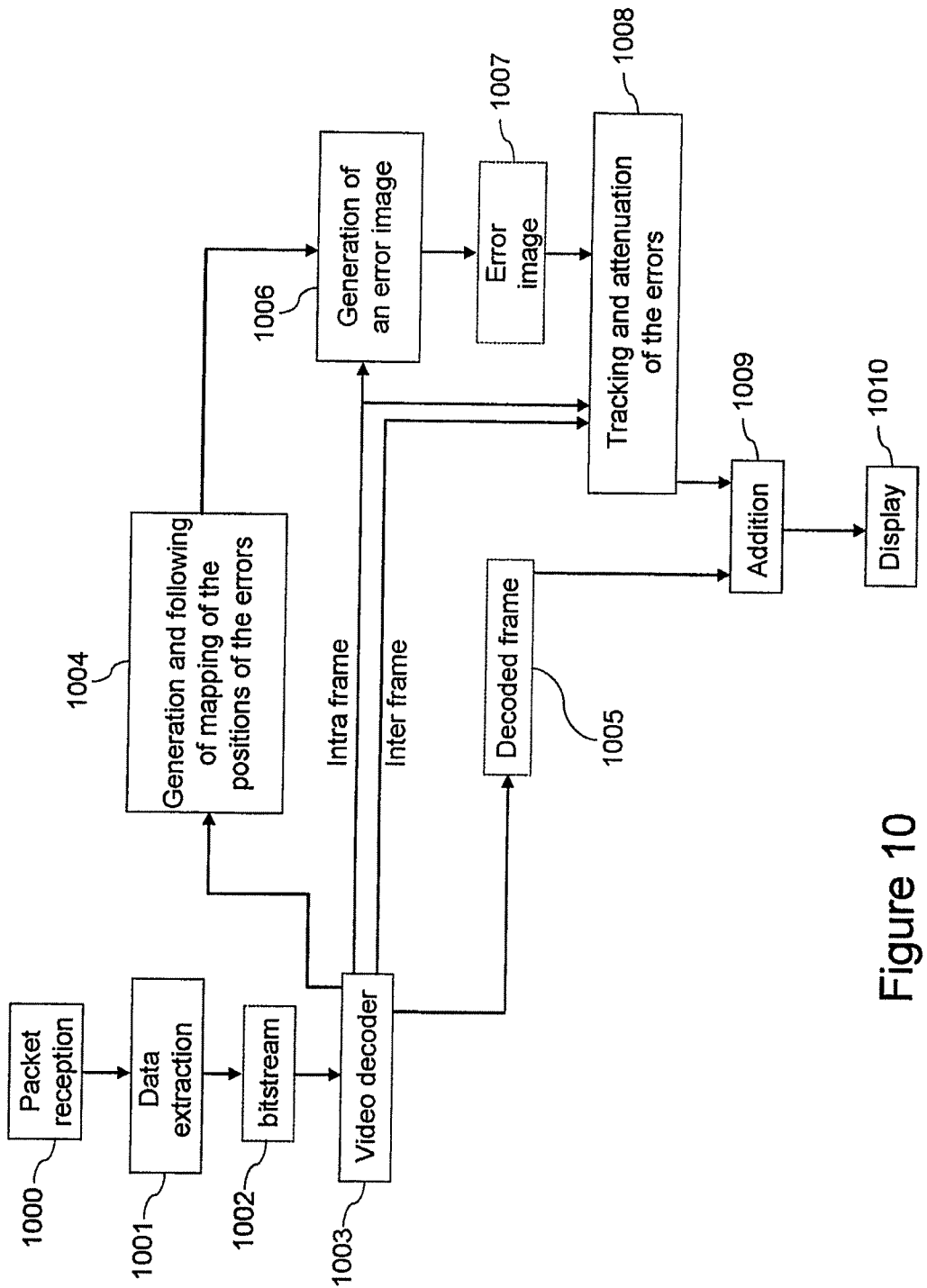
Figure 11:
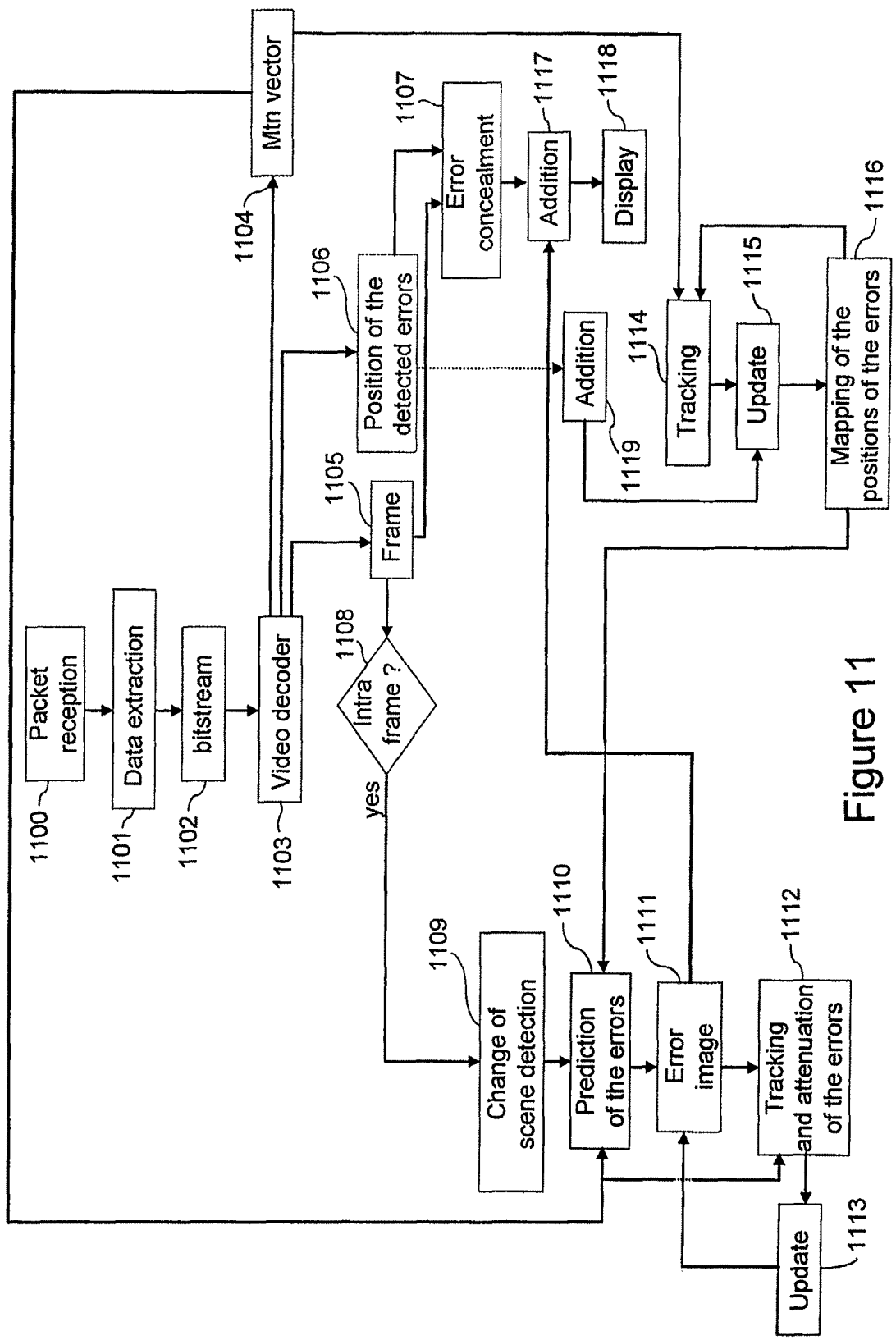
Figure 12:
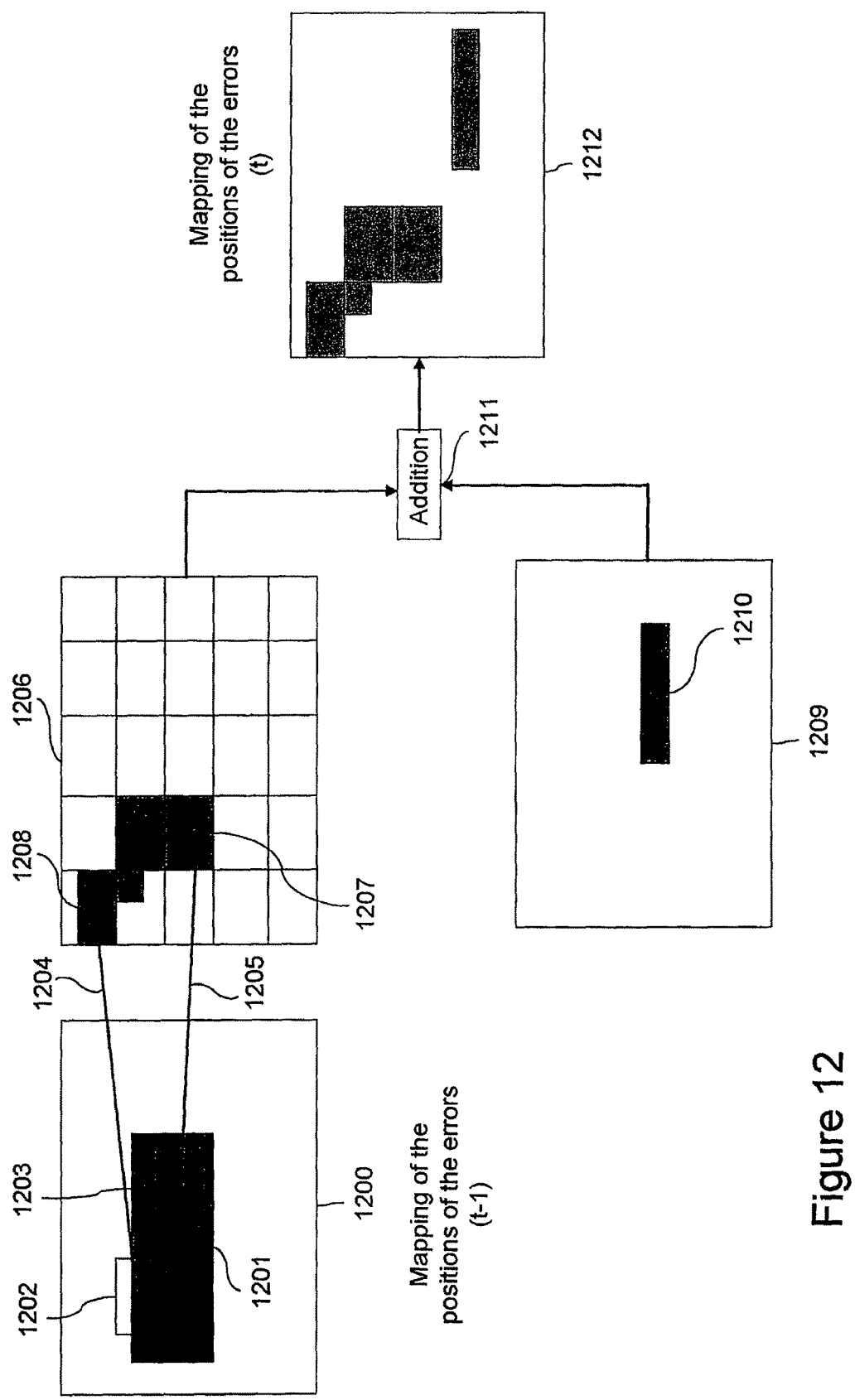
Figure 13:
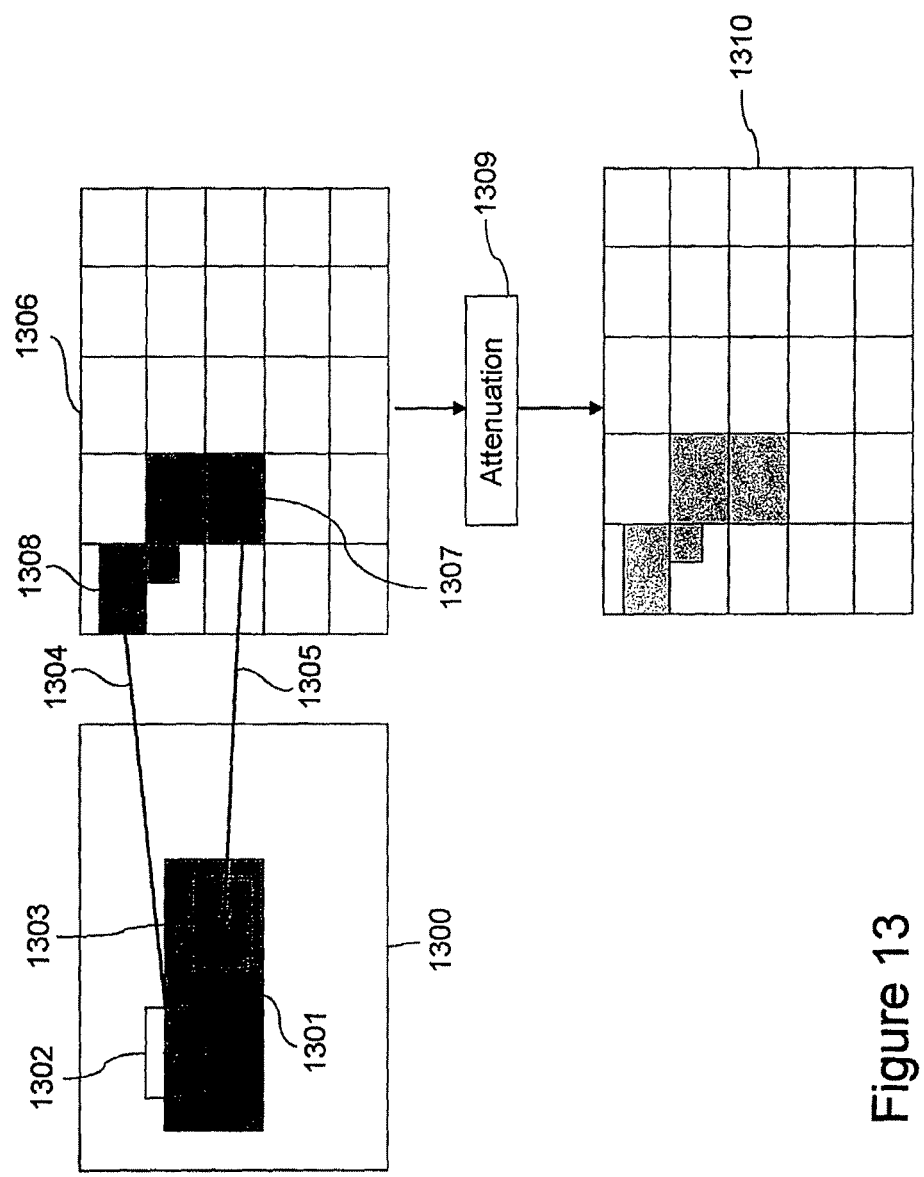
Figure 14:
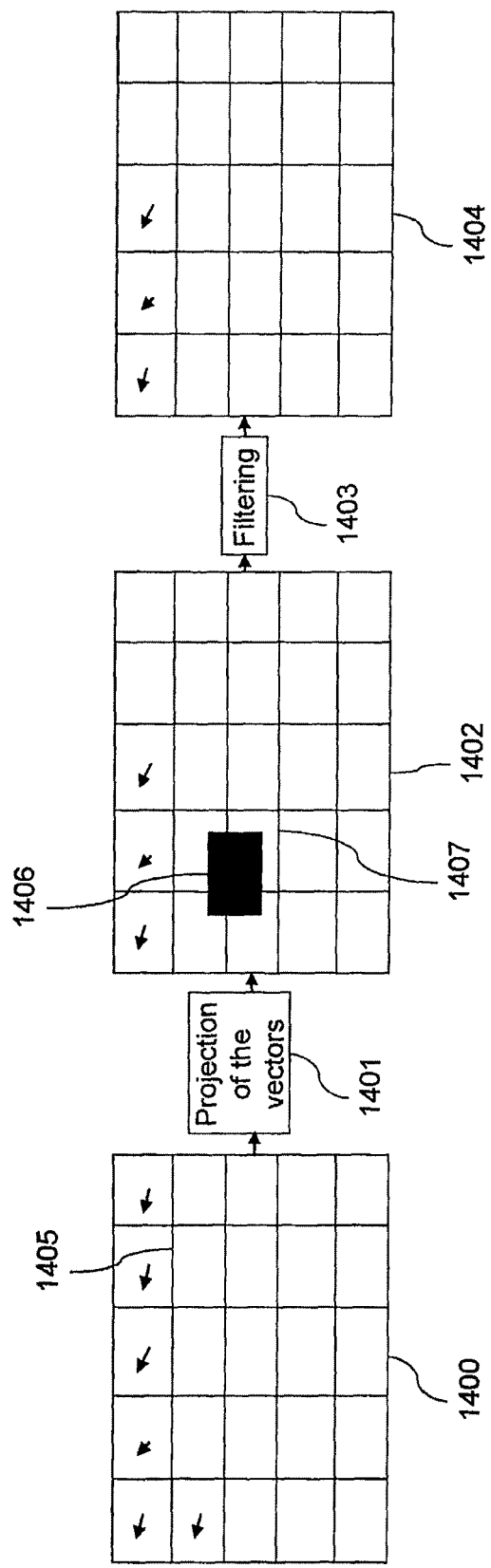
Figure 15:
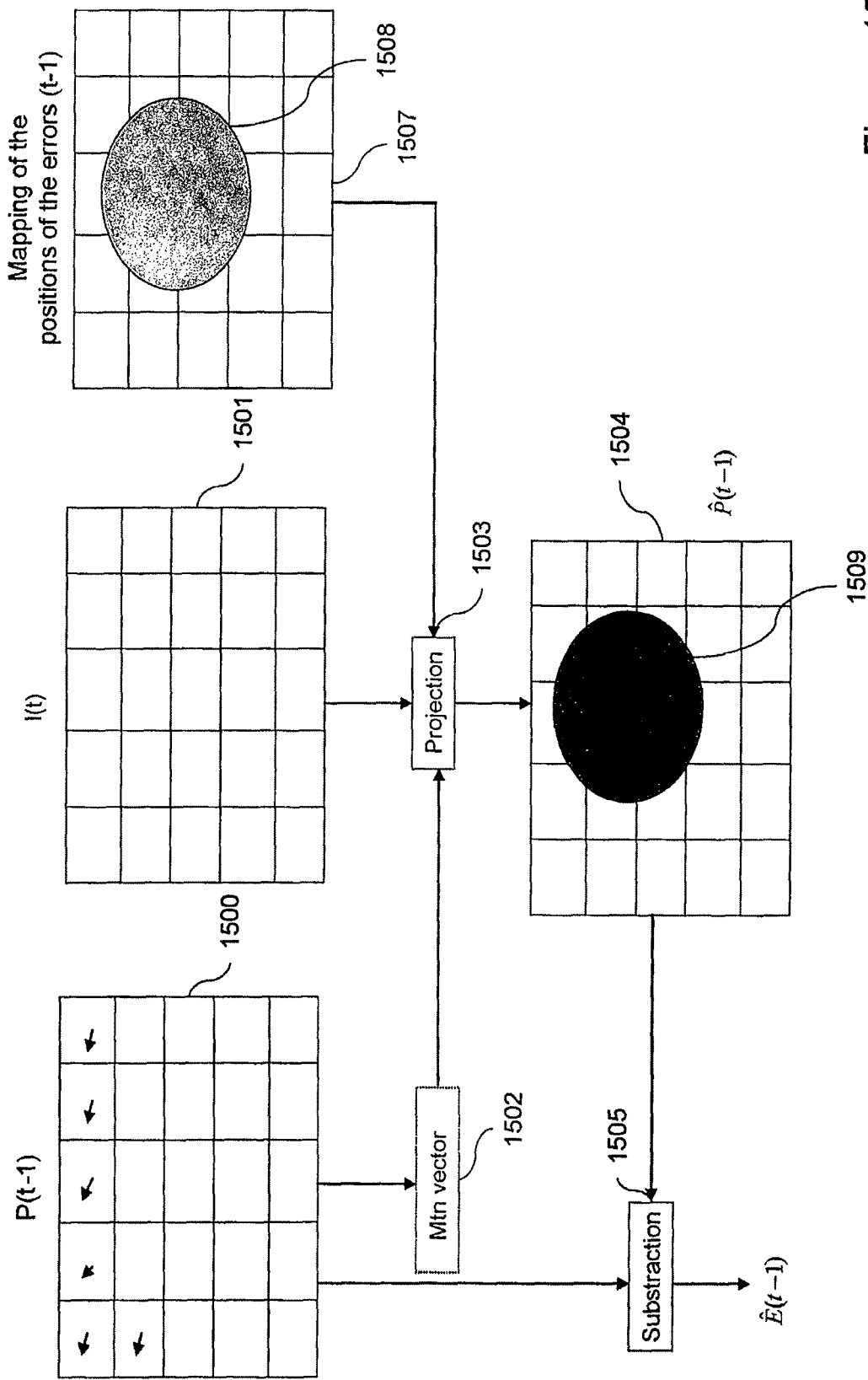

FIG. 3 describes the principle of an example of the slow re-synchronization process, according to a first embodiment, in the form of a time diagram, of a video stream having suffered a transmission error;

FIG. 4 presents a possible hardware implementation of the time diagram described with reference to the previous figure;

FIG. 5, comprising FIGS. 5a and 5b, illustrates the algorithms implemented in the coder and in the decoder of FIG. 4;

FIG. 6 describes schematically the PropagateLoss(k,t) function used in FIG. 4 for calculating the damaged current frame serving as a reference for the decoder;

FIG. 7 illustrates an example of the slow re-synchronization phase carried out on the decoder; according to a second embodiment;

FIG. 8 illustrates the diagram of a decoding system adapted to implement the algorithm described with reference to FIG. 7 according to which an intermediate current frame is calculated from the correct frame and the simulated damaged frame;

FIG. 9 illustrates the principle of an example of the slow re-synchronization process according to a third embodiment;

FIG. 10 schematically illustrates the processing operations used to implement the invention according to the third embodiment;

FIG. 11 is a detailed representation of FIG. 10;

FIG. 12 illustrates the tracking of the errors in the mapping of the positions of the errors enabling the implementation of the third embodiment;

FIG. 13 illustrates the step of tracking and attenuating the errors illustrated in FIG. 11;

FIG. 14 illustrates the manner in which a field of vectors may be determined in relation to an Intra frame for the implementation of the third embodiment;

FIG. 15 illustrates the step of generating an error image of FIG. 10; and

Figure 16:
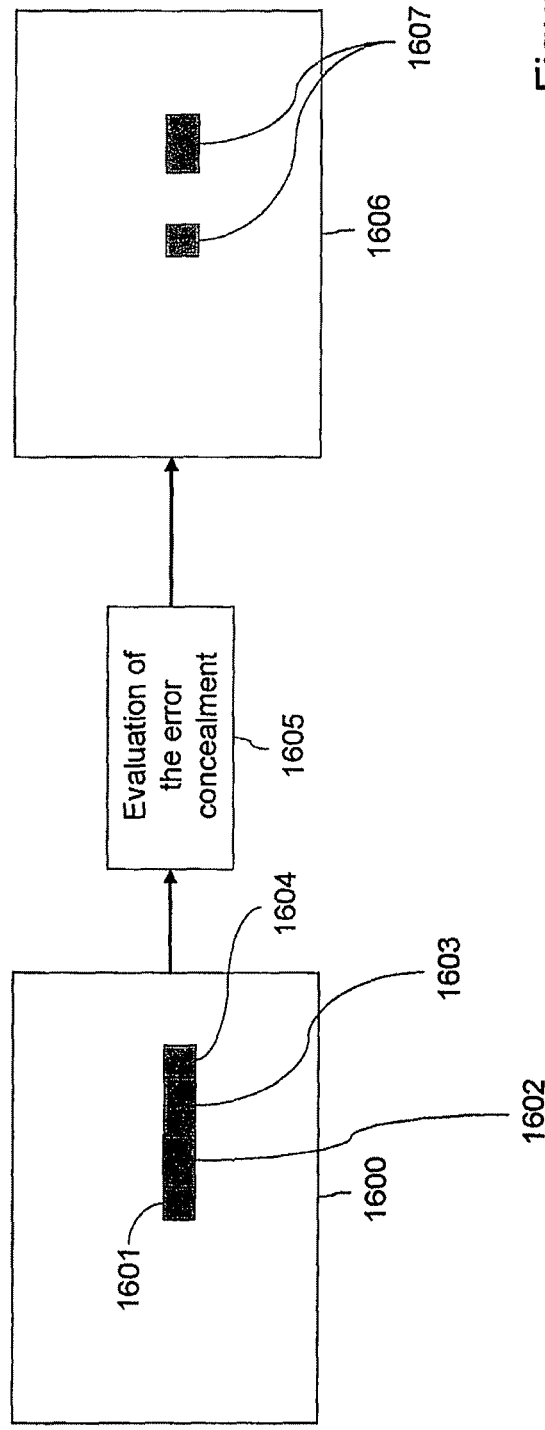

FIG. 16 represents an alternative to the method described by reference to FIG. 12 for tracking the errors in the mapping of the positions of the errors in order to improve the transition between frames containing errors and frames not containing any error or containing different errors.

An object of the methods and devices according to the invention is to carry out a progressive dissolving of the damaged video to the re-synchronized video. The progressive dissolving can be implemented at the decoder or coder.

Schematically, according to a first and a second embodiment, the solution described requires the creation and the management of two parallel video streams over a given period of transition:

the re-synchronized and therefore valid stream that begins with the Intra frame received; and the damaged stream on which the errors are propagated beyond the moment at which the Intra frame is received, as if the latter had not yet arrived.

The damaged stream corresponds to the actual stream resulting from the processing by the client if the progressive dissolving mechanism is implemented by the client and to a simulated stream if the progressive dissolving is implemented by the server.

The stream obtained by the progressive dissolving between the re-synchronized stream and the damaged stream corresponds to the displayed stream if the progressive dissolving mechanism is implemented by the client and to the coded stream if the progressive dissolving mechanism is implemented by the server. The stream obtained makes it possible to pass gently from the damaged stream to the valid stream, concealing further the corrective processing carried out.

It should be noted that the use of a loss concealment mechanism is optional, although complementary to progressive dissolving.

When the progressive dissolving is implemented by the server, that is to say by the coder, it is necessary, on reception of a negative acknowledgement, to simulate the loss concealment performed by the decoder, as well as the error propagation as far as the current frame, and then to code the intermediate frames of the dissolving by recalculating the reference frame of the decoder taking into account the successive dissolving. Once the negative acknowledgement informed about the erroneous packet has been sent, indicating in particular the lost areas of the frame, the decoder takes no particular action, the stream received containing intrinsically the gentle re-synchronization. This solution therefore involves only the modification of the coder.

When the progressive dissolving is implemented by the client, that is to say by the decoder, it is necessary to have available, at the start of the re-synchronization, an Intra frame for actually re-synchronizing the stream and an Inter frame for allowing the propagation of errors and simulating the damaged stream over the transition period. An interpolation of this frame by the decoder is optionally possible by loss concealment techniques but risky in the case of complex motions. This solution does however have the advantage of modifying only the decoder. In order to obtain a better quality of a progressive stream, it is preferable to indicate to the coder to duplicate the re-synchronization frame by sending an I frame and a P frame that the decoder will be able to identify and process separately. Thus such a solution also requires a modification of the coder.

According to a third embodiment, the progressive dissolving is implemented by the client. An Intra frame following a degraded Inter frame is used here to predict a corresponding non-degraded Inter frame, these Inter frames being combined to progressively reduce the effect of the degradation.

Figure 1:
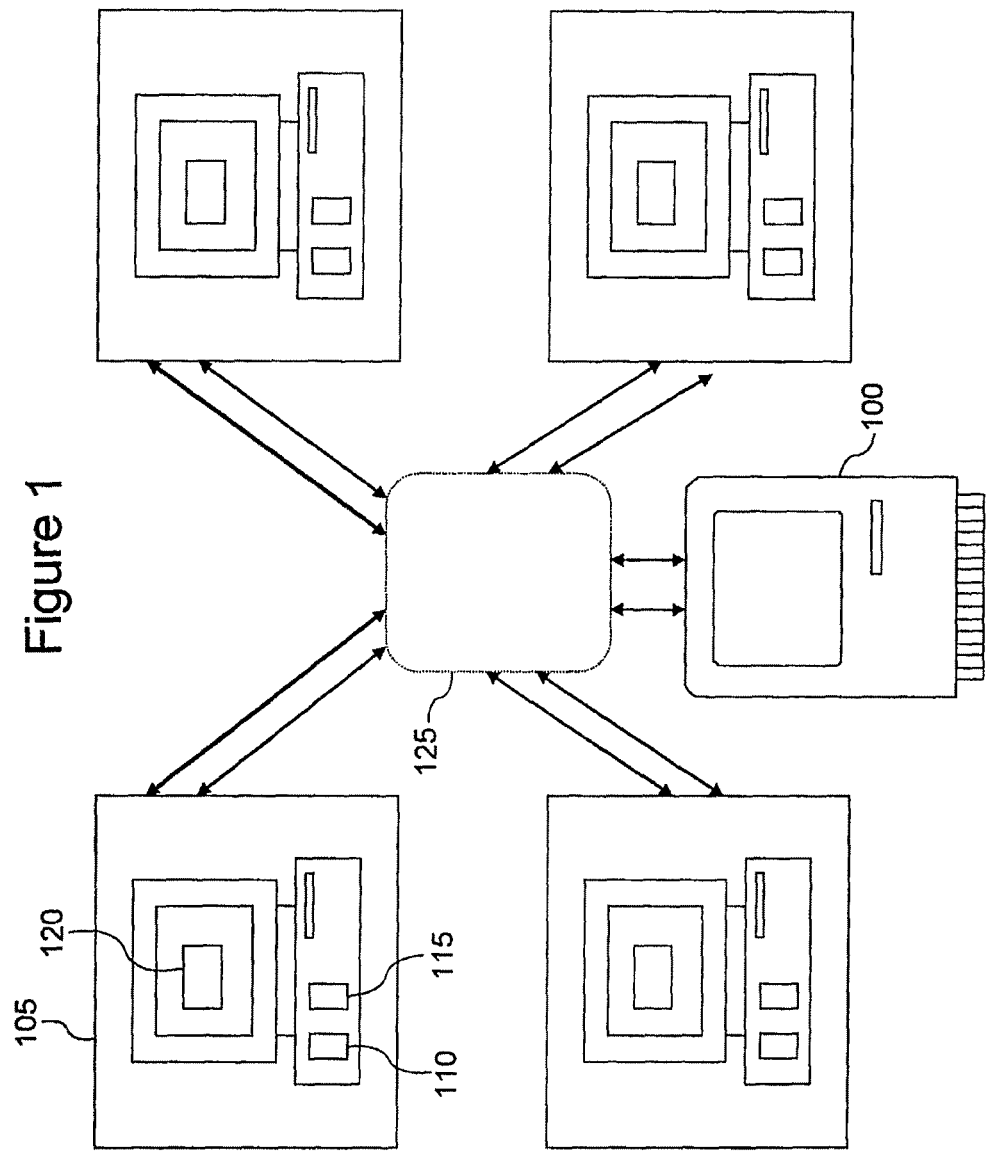
FIG. 1 depicts schematically a distributed network in which a server can transmit a multimedia content to a client.
Figure 2:
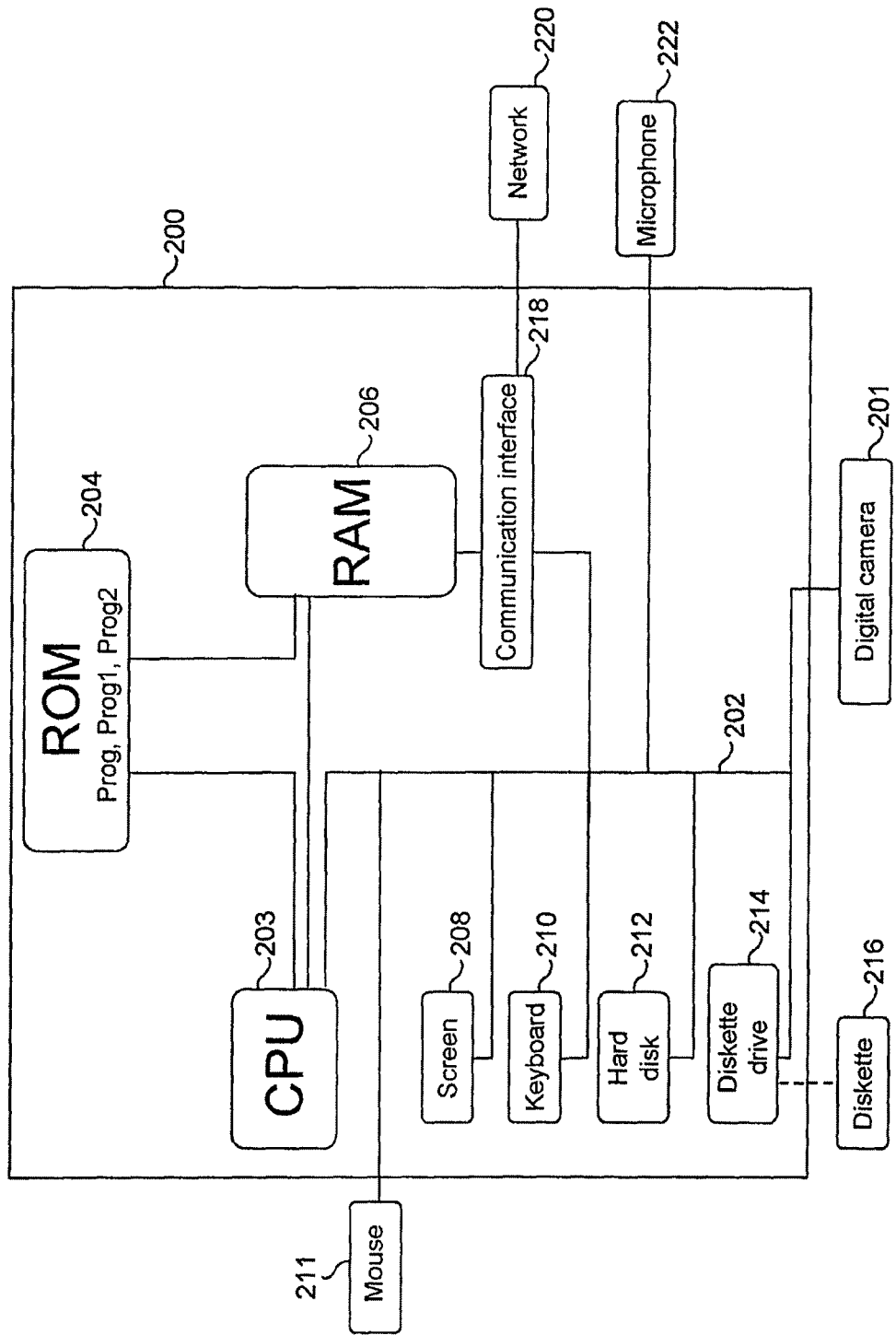
FIG. 2 shows an example of an apparatus making it possible at least partially to implement the invention.

An apparatus implementing the invention or a part of the invention is illustrated in FIG. 2. The device 200 is for example a micro-computer, a workstation, a digital assistant, a mobile telephone, a digital video camera, a stills camera, a video surveillance camera (Webcam), a DVD reader or a multimedia server. If this apparatus does not directly incorporate a digital image captor, it may optionally be connected to different peripherals such as a digital video camera 201 (or an analog to digital converter or any other video capture means) connected to a graphics card and supplying the apparatus with multimedia data.

The apparatus 200 comprises a communication bus 202 to which there are connected:

a central processing unit or microprocessor 203 (CPU);

a read-only memory 204 (ROM, acronym for Read Only Memory) able to contain the programs "Prog", "Prog1" and "Prog2";

a random access memory or cache memory (RAM, acronym for Random Access Memory) 206, comprising registers adapted to record variables and parameters created and modified during the execution of the aforementioned programs; and, a communication interface 218 connected to a distributed communication network 220, for example the Internet, the interface being able to transmit and receive data.

Optionally, the apparatus 200 may also have:

a screen 208 for viewing data and/or serving as a graphical interface with the user, who will be able to interact with the programs according to the invention, using a keyboard 210 or any other means such as a pointing device, for example a mouse 211, an optical stylus, a touch screen or a remote control device;

an input/output card (not shown) connected to a microphone 222 in the case, for example, of audio data;

a hard disk 212 able to contain the aforementioned programs "Prog", "Prog1" and "Prog2" and data processed or to be processed according to the invention;

a disk drive 214 adapted to receive a diskette 216 and to read or write thereon data processed or to be processed according to the invention; and, a reader for memory cards adapted to read or write thereon data processed or to be processed according to the invention.

The communication bus affords communication and interoperability between the different elements included in the apparatus 200 or connected to it. The representation of the bus is non-limiting and, in particular, the central processing unit is capable of communicating instructions to any element of the apparatus 200 directly or by means of another element of the apparatus 200.

The executable code of each program enabling the programmable apparatus to implement the processes according to the invention may be stored, for example, on the hard disk 212 or in read only memory 204.

According to a variant, the diskette 216 can contain data as well as the executable code of the aforementioned programs which, once read by the apparatus 200, will be stored on the hard disk 212.

As a second variant, the executable code of the programs can be received by the intermediary of the communication network 220, via the interface 218, in order to be stored in an identical fashion to that described previously.

The diskettes can be replaced by any information carrier such as a compact disc (CD-ROM) or a memory card. Generally, the diskettes may be replaced by information storage means, which can be read by a computer or microprocessor, integrated or not into the apparatus, which may possibly be removable, and which are adapted to store one or more programs whose execution permits the implementation of the method according to the invention.

More generally, the program or programs may be loaded into one of the storage means of the apparatus 200 before being executed.

The central processing unit 203 will control and direct the execution of the instructions or portions of software code of the program or programs according to the invention, these instructions being stored on the hard disk 212 or in the read-only memory 204 or in the other aforementioned storage elements. On powering up, the program or programs which are stored in a non-volatile memory, for example the hard disk 212 or the read only memory 204, are transferred into the random-access memory 206, which then contains the executable code of the program or programs according to the invention, as well as registers for storing the variables and parameters necessary for implementation of the invention.

It should be noted that the communication apparatus comprising the device according to the invention can also be a programmed apparatus. This apparatus then contains the code of the computer program or programs for example fixed in an application specific integrated circuit (ASIC).

FIG. 3 describes the principle of a first example of the slow re-synchronization process, according to a first embodiment, in the form of a time diagram, of a video stream having suffered a transmission error; The terms "slow" re-synchronization and "gentle" transition signify that the video stream presented to the client converges progressively towards a sequence having an optimal quality after re-synchronization by an Intra frame. The process described with reference to FIG. 3 is the slow re-synchronization process implemented in the coder, that is to say by the server.

The reference 300 designates the data exchanges over time between the server and the client. The time scale 305 indicates the moment at which the server transmits or receives data while the time scale 310 indicates the moment at which the client transmits or receives data. For example at time k, the server transmits (reference 315) the P(k) frame that is received by the server at time k'.

The server thus sends video packets to the client, who receives them, stores them and decodes them as they are received. When a transmission error is detected, for example affecting the P(k) frame, the client returns (reference 320) a message NACK(k) (acronym for Negative ACKnowledgment) to the server in order to indicate to it that he has lost data of the frame k. During this time, the server has continued to send packets corresponding to I Intra frames or P Inter frames. In this example, the server has transmitted the P(k+1) to P(k+10) Inter frames before receiving the information according to which the client has detected an error on the P(k) Inter frame.

On reception of the NACK(k) (time t=k+10 in FIG. 3), the coder of the server evaluates the need to send a re-synchronization Intra frame. An Intra frame is not always sent. For example, it does not send an Intra frame if it has in the meantime sent another Intra frame, according to the normal cycle, that has already performed the re-synchronization. Likewise, when the server can simulate the loss concealment performed on the client and it considers that this is effective, it may decide that it is unnecessary to perform a re-synchronization.

For the requirements of the description, it is assumed hereinafter that the server decides to refresh the stream in order to stop any error propagation. For the same reasons, it is also accepted that the coder is capable of simulating the reference frame of the decoder according to the losses declared by the NACK(i) received, and therefore to then simulate the propagation errors on the following frames.

Unlike the standard process, the coder does not directly send an abrupt Intra (t+1) re-synchronization frame. The coder simulates the loss concealment at time k and calculates the error propagation until the current time t. It thus has available the damaged reference frame from the decoder at time t.

Then, over a period of N frame codings deter-mining the duration of the gentle transition, for example N=5, the coder performs the following operations:

construction of the reference frame of the coder $\tilde{I}_t$ (actual video);

construction of the reference frame from the decoder $\tilde{I}_t^*$ (damaged video) with simulation of the error propagation;

calculation of a weighted $I_t'$ frame between $\tilde{I}_t$ and $\tilde{I}_t^*$, for example according to the formula $$I_t' := \frac{i}{N}\tilde{I}_t^* + \frac{N-i}{N}\tilde{I}_t$$

effecting a linear dissolving between the two streams;

coding of $I_t^*$ into $I_t'$ taking as a reference the $\tilde{I}_{t-1}'$ frame; and sending to the client the P'(t) predictive Inter frame corresponding to this $\tilde{I}_t'$ frame.

At the end of the sending these (N-1) intermediate frames and if no other error has occurred, the decoder is completely re-synchronized with the coder, which continues its coding into P(i) Inter frames with the reference $\tilde{I}_t$ frame in the normal way.

The reference 350 designates the variation in the PSNR over time, that is to say the variation in a quantization of the error introduced into the frame displayed by the client. The curve 355 represents the PSNR of the video before coding and transmission, that is to say the PSNR of the video stream comprising no error. The curve 360 designates the PSNR of the video stream coded and transmitted to the client. At time k', when the P(k) Inter frame comprising an error is received, the PSNR drops abruptly. Because of the propagation of the error, the PSNR continues to fall until the time when the server receives the NACK and transmits a corrected frame. At this moment, the PSNR is not abruptly corrected but is progressively increased.

FIG. 4 presents a possible hardware implementation to obtain the time diagram described by reference to FIG. 3. The predictive schema of the coder presented in that Figure illustrates the calculation of the intermediate current frame between the correct frame and the simulated damaged frame.

According to the invention, an intermediate frame is calculated from the correct stream and the damaged stream simulated by the coder. This intermediate frame is always coded with respect to the reference frame from the decoder.

The part marked in continuous lines represents the main coding loop for the input (valid) $I_t$ frames and comprises a coding module denoted ENC_DEC (described with reference to FIG. 5a). The coder supplies the reconstructed $\tilde{I}_t$ frame. The part marked in doffed lines represents the process of initialization, on signaling of loss, of the coder for the slow re-synchronization. This part uses an error propagation procedure comprising the function "PropagateLosses" that reconstructs the damaged reference frame of the decoder at the current moment by the coder. The part in continuous fine lines represents the coding loop of the intermediate $I_t'$ frames for the slow re-synchronization of the decoder. It uses a decoder DEC referenced DEC* (described with reference to FIG. 5b) in order to simulate the propagation of the errors $\tilde{I}_t^*$ beyond the current time, and a coder ENC_DEC referenced ENC_DEC' for coding the slow re-synchronization $I_t'$ frames.

The intermediate $I'_t$ frame between $\tilde{I}^*_t$ and $\tilde{I}_t$ can be calculated simply according for example to the equation $$I'_t := \frac{i}{N}\tilde{I}^*_t + \frac{N-i}{N}\tilde{I}_t$$

where i is the dissolving index that can be defined in the following fashion:

i is equal to zero when no dissolving is underway (the $I'_t$ frame is then identical to the $\tilde{I}_t$ frame);

i is initialized to the value N−1 at the start of re-synchronization;

if i is strictly greater than zero, the dissolving index i is decremented progressively with the slow re-synchronization and ends up at the value zero at the end of slow re-synchronization (at the start of synchronization $I'_t \approx \tilde{I}^*_t$ and at the end of synchronization $I'_t = \tilde{I}_t$); and i is forced to the value zero at the start of a sequence or GOP (acronym for Group Of Pictures).

During the initialization step 401 the variable t representing the number of the current frame is initialized to the value $t_0$.

In the principal coding loop, the storage peripheral 402 (or alternatively a video acquisition peripheral) supplies the $I_t$ frame. A test 403 is then performed in order to determine whether the $I_t$ frame is a start of sequence (or start of GOP) Intra frame.

If the $I_t$ frame is a start of sequence Intra frame, the dissolving index i is initialized or reinitialized to the value zero (step 404) to stop any re-synchronization in course.

If the $I_t$ frame is not a start of sequence Intra frame, a second test is performed in order to determine whether the dissolving index i is strictly greater than zero (step 405). If the dissolving index i is not strictly greater than zero, the dissolving index i is decremented by one (step 406).

If the dissolving index i has been initialized or reinitialized to the value zero or is not strictly greater than zero, the reference frame from the decoder $\tilde{I}^*_t$ is reinitialized according to the previously calculated $\tilde{I}_t$ frame (reference 410).

Next, at step 408, the coder ENC_DEC supplies as a main output (reference 409) the motion vector data and the residual values for a P Inter frame or a spatially compressed frame for an I Intra frame and as a secondary output (reference 710) the reconstructed $\tilde{I}_t$ frame. The coder ENC_DEC updates its own reference frame.

The decoding module DEC* receives the coded frames and simulates the propagation of the losses (step 411) if a re-synchronization is underway since its reference frame (reference 724) is initialized to the value of the damaged frame. When no error has occurred, the decoder DEC* has available the same reference frame as the coder ENC_DEC. It should be noted that the decoder DEC* continues to drift until the next Intra frame without error or until the next initialization (reference 424). The dissolving index i being equal to zero, a false $\tilde{I}^*_t$ frame coming from the decoder DEC* has no consequence on the transmitted $I'_t$ frame.

At step 412, the intermediate frame (reference 413) between the correct video stream (reference 410) and the damaged video stream (reference 411), weighted by the dissolving index i, is calculated.

The coder ENC-DEC' then codes (step 415) the intermediate $I'_t$ frame (reference 413) with the reference $I'_{ref}$ frame (reference 414).

The coded $I'_t$ frame (reference 416) is transformed into data packets that are transmitted (step 417) to the transmitter 418, which sends the packets to the client.

If no error NACK(k) is signaled by the client (step 419), the current frame number is incremented (step 420) and the previous steps are repeated as illustrated.

If on the other hand an error NACK(k) is signaled by the client (step 419), the dissolving index i is initialized to the value N and the loss concealment at time k is simulated with the loss information "Lossinfo" (reference 422) received. The propagation of the errors is tracked until current time t in order to obtain the reference frame of the damaged video $I^*_t$ (reference 423) at step 421. This $I^*_t$ frame is reproduced as reference frame by the decoder DEC* (reference 424) and by the coder ENC_DEC' (reference 414). The current frame number is then incremented (step 420) and the preceding steps are repeated as illustrated.

FIG. 5, comprising FIGS. 5a and 5b, illustrates the algorithms implemented in the coder and in the decoder, respectively.

FIG. 5a describes more precisely the structure and sequence of the operations performed by the coder ENC_DEC at time t in order to deliver an Intra frame, that is to say a frame directly compressed spatially, or an Inter frame, that is to say a frame of the quantized residual prediction errors $E^q_t$, with its associated motion vectors $MV_t$ from the original $I_t$ frame to be coded and the reference $I_{ref}$ frame, that is to say the previous $\tilde{I}_{t-1}$ frame as reconstructed by the decoder.

By extension and in order to simplify the diagram and associated description, the processing operations are described for an entire frame although they are generally applied to each macroblock MB of the input frame. The notations are also simplified to the entire frames although they should refer to the macroblocks of the frames. Thus, for example, the DCT (acronym for Discrete Cosine Transform) processing operations and the estimation of the motion compensation expressed on the $I_t$ frame are in fact performed on each macroblock MB composing the $I_t$ frame. In addition, only the coding and decoding of I and P frames are considered (according to a preferred embodiment of the invention, the B frames are not used).

The coder ENC_DEC is capable of simulating a loss concealment and its drift.

At time t, the frame (or more precisely the macroblock) to be coded $I_t$ is transmitted to the input 501 of the coder, which has available internally the reference $I_{ref}$ frame from the decoder, that is to say generally the previous frame (t−1) reconstructed $\tilde{I}_{t-1}$ or possibly initialized by the input $I_{ref}$ (501") of the coder. When a data loss from the decoder of the client is simulated on the server, the data "LossInfo", recovered via the return channel, are available on the input 501'.

The motion estimation module identifies for each macroblock MB of the $I_f$ frame, by a standard "Block Matching" algorithm, an area of the same size as the reference $I_{ref}$ frame that resembles it most. The motion estimation module derives therefrom the motion vectors $MV_t$ that minimize the prediction error (step 502).

The motion compensation module then calculates, from the reference $I_{ref}$ frame and the motion vectors $MV_t$ calculated at step 502 the compensated (or predicted) $\hat{I}_t$ frame.

When data are lost, the temporal loss concealment module attempts to repair the damaged or lost regions of the predicted $\hat{I}_t$ frame from the loss information "LossInfo" supplied as parameters. The temporal loss concealment module constructs a corrected $\hat{I}^c_t$ frame (step 504). If no loss is signaled, $\hat{I}^c_t$ is identical to $\hat{I}_t$.

The frame of the residual raw compensation errors is calculated according to the equation $E_t = I_t - \hat{I}_t^c$ (step 505). The motion vectors $MV_t$ are used for coding the $E_t$ frame. For coding an Intra frame, the vectors are zero and $\hat{I}_t^c$ is forced to zero, which causes a simple spatial compression of the $I_t$ frame.

Before being transmitted to the network layer, the frame of the errors $E_t$ is compressed by a DCT transform and then quantized in order to minimize the size of the data to be transmitted (step 506). This compression degrades the frame of the errors $E_t$ into a frame of the quantized errors $E_t^q$. $E_t^q$ is the final frame of the residual prediction errors. This final frame is transmitted, with the motion vectors $MV_t$, after a VLC (acronym for Variable-Length Code) entropy coding and a transformation in the form of data packets (reference 512). For reasons of clarity, the entropy coding and decoding modules (which are known), are not shown.

In order to have available the frame of the errors actually reconstructed by the decoder in order to calculate the current $\tilde{I}_t$ frame reconstructed by the decoder, constituting the next reference frame, it is necessary to carry out inverse transformation, that is to say inverse quantization and inverse DCT transformation (step 507).

The new reference frame is calculated as the reconstruction of the current frame in accordance with the equation $\tilde{I}_t = \hat{I}_t^c + \tilde{E}_t$ where $\hat{I}_t^c$ is the compensated and possibly corrected frame of the old reference frame with the motion vectors virtually transmitted (steps 503 and 504) and $\tilde{E}_t$ is the decompressed frame of the residual errors transmitted (step 507). If the coded frame is an Intra frame, the predicted $\hat{I}_t^c$ frame being null, the $\tilde{I}_t$ frame corresponds to the decompressed $\tilde{E}_t$ frame (step 507).

If data have been lost, the spatial loss concealment module spatially interpolates the last damaged areas issuing from the reconstruction of the $\tilde{I}_t$ frame at step 508 (step 509). As illustrated, the $\tilde{I}_t$ frame 510 is available at the output of the coder ENC_DEC and is stored as a new reference $I_{ref}$ frame (step 511).

The residue and the motion vectors $MV_t$ are supplied as the main output of the coder ENC_DEC in order to be transmitted to the data packet creation module.

The diagram in FIG. 5a is also valid for the coding of Intra frames, the main difference being that the motion estimation is not made (the vectors $MV_t$ are null), and that the residue $E_t$ is forced to 0.

FIG. 5b describes more precisely the structure and sequence of the operations performed by the decoder DEC at time t in order to deliver a $\tilde{I}_t$ frame from the frame of the quantized residual errors $E_t^q$ and associated motion vectors $MV_t$ as well as the reference $I_{ref}$ frame, generally corresponding to the decoded previous image. The decoder DEC here has available the same temporal and spatial loss concealment modules as the coder.

At time t, the decoder DEC receives the data of the frame to be decoded ($E_t^q$, $MV_t$) at the input 521 and extracts therefrom the frame of the residues $E_t^q$ and the motion vectors $MV_t$ for an Inter frame (P) or a compressed $E_t^q$ frame for an Intra frame (I). The loss information is available at the input 521' of the decoder DEC. The decoder DEC also has available the reference $I_{ref}$ frame, generally the frame previously reconstructed (t−1) or possibly initialized by the input $I_{ref}$ 521" of the decoder DEC.

The motion compensation module then calculates the compensated (or predicted) $\hat{I}_t$ frame from the reference $I_{ref}$ frame and the motion vectors $MV_t$, (step 522).

If data have been lost, the temporal loss concealment module attempts to repair the damaged or lost regions of the predicted $\hat{I}_t$ frame from the loss information "LossInfo" received (step 523). The corrected frame is the $\hat{I}_t^c$ frame. If no data have been lost, the $\hat{I}_t^c$ frame is identical to the $\hat{I}_t$ frame.

In parallel to the steps 522 and 523, the frame of the errors $E_t^q$ is decompressed by an inverse quantization followed by an inverse DCT transformation (step 524) in order to reconstruct the frame of the errors $\tilde{E}_t$ (or the complete frame if the frame to be decoded is an Intra frame).

The final $\tilde{I}_t$ frame is then reconstructed (step 525) by adding the frame of the residues $\tilde{E}_t$ issuing from step 524 with the compensated $\hat{I}_t^c$ frame issuing from step 523. If the frame to be decoded is the Intra frame, the compensated $\hat{I}_t^c$ frame is forced to zero.

If errors (residual damage) remain, the spatial loss concealment module spatially interpolates the last damaged regions issuing from the reconstruction of the $\tilde{I}_t$ frame at step 525 (step 526). The $\tilde{I}_t$ frame, corrected at step 526 if necessary, is available at the output of the decoder DEC, for example for a storage peripheral or to be displayed. The $\tilde{I}_t$ frame is preferably stored as the new reference $I_{ref}$ frame The coder ENC_DEC and the decoder DEC each have an input $I_{ref}$ that makes it possible if necessary to initialize their reference frame. Although this possibility is not always available in reality, it must be considered that this is not essential. This is because it is obvious to a person skilled in the art to initialize a frame as a reference frame by coding it and/or decoding it before the processing of the required video sequence. Decoding or coding a frame automatically places it as the reference frame of the coder or decoder.

FIG. 6 describes schematically the function PropagateLoss (k,t) used in FIG. 4 for calculating the damaged current $\tilde{I}_t^*$ frame serving as a reference for the decoder at time t. The damaged current $\tilde{I}_t^*$ frame is obtained by simulating the loss concealment $\tilde{I}_k^*$ and then by propagating the errors from the frame k.

The calculation of the damaged current $\tilde{I}_t^*$ frame is carried out in two steps: the calculation of the loss concealment at time k (illustrated with broken lines) and the calculation of the propagation of errors from k+1 to t (illustrated with continuous lines). It should be recalled here that the presence of a loss concealment module is optional.

With regard to the calculation of the loss concealment at time k, it is assumed that the coder has a loss concealment module identical to that of the decoder. The negative acknowledgement signal NACK(i) contains here at a minimum the number of the packet lost, and possibly other information such as for example the parameters of the loss concealment carried out by the decoder for this loss. The coder is capable of managing the location of the frames sent and therefore knowing the regions damaged by the loss of a non-acknowledged packet. The coder is thus capable of simulating the correction made by the decoder at time k.

To effect the loss concealment and thus reconstruct the damaged $\tilde{I}_k^*$ frame at time k (step 601), the coder must have available the frame ($E_t^q$, $MV_t$) received with the precise information of the losses suffered (LossInfo) supplied at the time of the negative acknowledgement NACK(k) and the reference $\tilde{I}_{k-1}$ frame present in the decoder at the time of concealment.

In parallel, the coder reconstructs the $\tilde{I}_k$ frame (step 602), serving as a reference for the coder ENC_DEC at the following step.

To calculate the propagation of errors from time k+1 to time t, the coder simulates the propagation of the errors due to the loss concealment defects on the frame k.

To this end, the function PropagateLoss(k,t) has a conventional coder/decoder as described previously (ENC_DEC), correct frames of the video (in particular from time k+1 to t), and a conventional decoder as described previously (DEC*) in order to simulate the drifts occurring on the decoder of the client on the P(k+1) to P(t) Inter frames.

A loop is implemented in order to determine the frame comprising the cumulative error at each moment, between times k+1 and t. This loop is initialized by initializing the variable ι to the value k+1 (ι:=k+1) in order to load the frame k+1 in memory. The reference frame of the decoder ENC_DEC is initialized with the $\tilde{I}_k$ frame previously coded. The reference frame of the decoder DEC* is initialized with the $\tilde{I}_k^*$ frame previously calculated by the loss concealment module.

For each frame ι, the coder ENC_DEC codes the P Inter frame of the frame corresponding to time ι and refreshes its reference normally by the reconstructed frame (step 603). The decoder DEC* recovers the P Inter frame ($E_\iota^q$, $MV_\iota$) which it decodes with the damaged reference $\tilde{I}_{\iota-1}^*$ frame (step 604). The output frame from DEC* $\tilde{I}_\iota^*$ is the damaged frame in which the prior errors have been propagated. This frame becomes the new reference of the decoder DEC* in order to track the propagation on the following frames. A test is performed (step 605) on the number of the processed frame to make it possible to emerge from the loop when ι=t, that is to say when the $\tilde{I}_t^*$ frame is determined. If the processed frame is not the frame t, the variable ι is incremented by one and the previous steps are repeated.

Alternatively, according to a second embodiment, the slow re-synchronization mechanism may be implemented on the client. The principle is then to be able to have available on the client, at the decoding time t and throughout the gentle transition period, on the one hand re-synchronized stream and on the other hand stream damaged by error propagation.

The server must also be modified to transmit an P Inter frame on a secondary port immediately following the re-synchronization I Intra frame.

Only the decoder knows in real time if it is subject to losses. Certain I Intra frames are sent cyclically, every m frames, without having being explicitly requested following a loss. Thus, each I Intra frame may have a potentially abrupt re-synchronization effect in the event of drift in the video. It is therefore not necessary to differentiate the processing between one normal re-synchronization Intra frame and another due to transmission errors. Consequently it is necessary to constantly transport an P Inter frame on the secondary link for any I Intra frame, whether it is linked to the refresh period or to a negative acknowledgement. Thus the slow re-synchronization process can take place for any Intra frame in the presence of errors. When there is a change of sequence, the coder sends over the secondary link a particular P Inter frame, for example an empty image, indicating to the decoder a start of a sequence and that therefore the dissolving must be inhibited.

Two links are created between the server and the client: a main link (port1) for the conventional transmission of the video and a secondary link (port2) for the Inter frame transmission for the slow re-synchronization of the video.

The server transmits an $I_t^1$ Intra frame (the exponent indicates the number of the port) followed by m $P_{k(k=1+1 \to 1+m)}^1$ Inter frames to the client over the main link. When the $I_t^1$ frame is transmitted, the server also transmits a $P_t^2$ frame to the client. $P_t^2$ is preferably null if $I_t^1$ corresponds to a first frame in a sequence (GOP) otherwise $P_t^2$ is the Inter frame corresponding to the current frame. As the exponent indicates, the $P_t^2$ frame is transmitted over the secondary port.

On reception of a $P_{k(k=1+1 \to 1+m)}^1$ Inter frame, the client decodes the video stream in a standard fashion. If the decoder is in a state of error, the decoded frame is subject to the propagation of errors.

On reception of an erroneous packet, that is to say a packet whose data comprise at least one error, the client sends a negative acknowledgement NACK to the server. If the decoder has an error concealment module, it masks the error and goes into an error state.

On reception of a re-synchronization $I_t^1$ frame, if the decoder is not in an error state, it decodes the video normally and does not take account of the unnecessary $P_t^2$ Inter frame. If the decoder is in an error state, it uses the $P_t^2$ Inter frame to simulate the propagation of the errors throughout the dissolving. The dissolving index i is initialized to the value N−1. The decoder comes out of the error state and re-synchronizes slowly during the N following $P^1$ Inter frames. For each of the N following $P^1$ Inter frames, the coder calculates and displays an intermediate frame and decrements the dissolving index i.

FIG. 7 illustrates an example of the slow re-synchronization phase carried out on the decoder according to the second embodiment. In this example, N is equal to five, that is to say the complete re-synchronization requires five frames. The right-hand graph shows the change in the quality 700 measured by a PSNR for the frame decoded by the decoder of the client and the quality 705 measured by a PSNR for the frame before coding by the server.

During the period 710, there is no error detected, the $P^1(j<k)$ Inter frames received on the principal stream have been decoded correctly. The decoded $\tilde{I}_t$ frame and the resulting $I_t'$ frame are identical (the dissolving index i is equal to zero) and the PSNR of the decoded frame is therefore maximal.

At the time 715 an error is detected on the $P^1(k)$ Inter frame despite the loss concealment. The dissolving index i is still equal to zero, the $\tilde{I}_t$ and $I_t'$ frames undergo the same drift related to the propagation of the error. The PSNR of the decoded frame drops abruptly. The client transmits a negative acknowledgement NACK to the server.

During the following period 720, the error received in the $P^1(k)$ Inter frame is propagated during the decoding of the $P^1(k+1)$ to $P^1(k+10)$ Inter frames. Once again, the dissolving index i still being equal to zero, the $\tilde{I}_t$ and $I_t'$ frames still undergo the same drift relating to the propagation of the error. The PSNR remains low.

On reception of the negative acknowledgement from the client, the server transmits the $I^1(k+11)$ Intra frame over the main stream and the $P^2(k+11)$ frame over the secondary stream.

At the time 725, the $I^1(k+11)$ and $P^2(k+11)$ frames are received by the client in order to allow slow re-synchronization. The $\tilde{I}_t^*$ frame is initialized with the received $P^2(k+11)$ Inter frame, the $\tilde{I}_t$ frame is re-synchronized with the received $I^1(k+11)$ Intra frame and the dissolving index is initialized to the value N−1. The new frame is calculated according to the same formula as previously $$\left(I_t' := \frac{i}{N}\tilde{I}_t^* + \frac{N-i}{N}\tilde{I}_t\right).$$

The PSNR increases slowly.

During the period 730, the $P^1(k+12)$ to $P^1(k+15)$ Inter frames make it possible to track the slow re-synchronization. The $\tilde{I}_t^*$ frame continues to drift whilst the $\tilde{I}_t$ frame is still re-synchronized. At each frame received, the dissolving index i is decremented by one, making the resulting $I_t'$ frame tend towards the decoded $\tilde{I}_t$ frame. The PSNR continues to rise.

At the time 735, N Inter frames allowing slow re-synchronization have been received (the dissolving index reaches the value zero). The $\tilde{I}_t^*$ frame continues to drift. The $\tilde{I}_t$ and $I_t'$ frames are identical. The PSNR has become maximal again.

During the period 740, normal decoding continues, the dissolving index i is zero. Despite the continuous and non-consequential drift of the $\tilde{I}_t^*$ frame, the $I_t'$ frame remains synchronized with the $\tilde{I}_t$ frame.

FIG. 8 illustrates the diagram of a decoding system adapted to implement the algorithm described with reference to FIG. 7 according to which an intermediate current frame is calculated from the correct frame and from the simulated damaged frame.

After having initialized the frame counter t to the value $t_0$ (step 801), the decoding system receives an $I^1$ Intra frame or a $P^1$ Inter frame on the port 1 having the reference 803 and possibly a $P^2$ Inter frame on the port 2 having the reference 804 (step 802).

A standard decoder DEC decodes the $I^1$ Intra frame received or the $P^1$ Inter frame received in order to reconstruct the $\tilde{I}_t$ frame (step 806).

When the $\tilde{I}_t^*$ frame is obtained from the decoder DEC* (step 819 described below), the intermediate $I_t'$ frame is calculated according to the dissolving index i (step 809). A test is then performed in order to determine whether the dissolving index i is strictly greater than zero (step 810). If so the dissolving index i is decremented by one (step 811) and a new test is performed in order to determine whether the dissolving index is zero (step 812). If the dissolving index is zero, the reference $\tilde{I}_t^*$ frame is replaced by the decoded $\tilde{I}_t$ frame (step 813).

The resulting $I_t'$ frame is stored in a frame buffer memory of the display peripheral in order to be displayed (step 814).

The frame counter t is then incremented by one (step 815) and the previous steps are repeated to the end of the sequence.

In parallel with the decoding of the $\tilde{I}_t$ frame, the decoding system determines a reference $\tilde{I}_t^*$ frame. For this purpose, a test is performed in order to determine whether the frame received is an $I^1$ Intra frame or a $P^1$ Inter frame (step 816).

If the frame received is a $P^1$ Inter frame, the decoder DEC* decodes the $P^1$ frame using the reference $I_{ref}^*$ in order to determine the new reference $\tilde{I}_t^*$ (step 819).

If the frame received is an $I^1$ Intra frame, another test is performed in order to determine whether the $P^2$ frame received on the second port is empty (step 817) in order to determine whether the frame received on the first port is an Intra frame corresponding to a first frame in a sequence (GOP). If the $P^2$ frame received on the second port is empty, the dissolving index i is initialized to the value zero (step 818) and the decoder DEC* decodes the $I^1$ frame using the reference $I_{ref}^*$ in order to determine the new reference $\tilde{I}_t^*$ (step 819).

If the frame received is an $I^1$ Intra frame and the $P^2$ frame received on the second port is not empty, another test is performed in order to determine whether the decoding system has detected a new error since the last negative acknowledgement (step 820). If a new error has been detected since the last negative acknowledgement, the dissolving index is initialized to the value N−1 (step 821) so that the $I^1$ Intra frame received is used to re-synchronize the stream. The $P^2$ Inter frame is then decoded by the decoder DEC* from the reference $I_{ref}^*$ in order to determine the new reference $\tilde{I}_t^*$ so as to track the propagation of the errors (step 819).

Alternatively, according to another implementation of the invention on the client (decoder), the solution consists of not simulating the real damaged $\tilde{I}_t^*$ frame as if no Intra frame had arrived, but to simulate the new damaged $\tilde{I}_t^*$ frame by a propagation of the error by the P Inter frame on the previous intermediate $I_{t-1}'^*$ frame where $I_t'^* = P(I_{t-1}'^*)$.

The intermediate $I_t'$ frame between $I_t'^*$ and $\tilde{I}_t$ is then calculated according to the equation $$I_t' := \frac{i}{N} I_t'^* + \frac{N-i}{N} \tilde{I}_t.$$

This formula makes it possible to simply define the processes of drift, dissolving and re-synchronization.

Thus, when the dissolving index i is equal to zero, the intermediate frame is identical to the decoded frame ($I_t' = \tilde{I}_t$), whatever the state of error of the decoder.

This solution makes it possible to reduce the necessary buffer memories, to simplify the re-synchronization process (the damaged frame re-synchronizes itself at t+N: when the dissolving index tends towards zero, the intermediate $I_{t+N}'$ frame tends towards the intermediate $\tilde{I}_{t+N}$ frame) and to limit the drift of the dissolving.

When the decoded video is not damaged, the $I_t'^*$, $I_t'$ and $\tilde{I}_t$ frames are identical and synchronous.

When a frame in the video stream received comprises an error, the $I_t'^*$, $I_t'$ and $\tilde{I}_t$ frames undergo the same drift according to the $P^1$ inter frames received. They are therefore identical and synchronous.

When the Intra $I^1$ and Inter $P^2$ frames arrive following the error, the $I_t'^*$ frame is kept in a state of drift, the $\tilde{I}_t$ frame is re-synchronized and therefore correct and the $I_t'$ frame is calculated by a dissolving between the $\tilde{I}_t$ and $I_t'^*$ frames according to the above equation. This process is repeated as far as the end of the slow re-synchronization.

At time t+N the dissolving index i reaches the value zero and the $I_{t+N}'$ frame is equal to the $\tilde{I}_{t+N}$ frame. The $I_{t+N}'^*$ frame, kept in a state of drift, re-synchronizes by itself at time t+N+1 by the $I_{t+N}'$ frame with the $I_{t+N+1}'$ and $\tilde{I}_{t+N+1}$ frames.

Still alternatively, a particular implementation of the invention consists of re-synchronizing the frame with a past frame from the coder, thus making it possible to accelerate the start of the slow re-synchronization.

For this purpose, the coder periodically evaluates the number of the frame d displayed by the decoder and determines for it a value D such that t>t−D>d, according to the state of the network. The frame (t−D) corresponds to a frame of the past of the decoder not yet displayed. At each frame decoding, the coder permanently stores and renews the I(t−D) Intra frame. For its part, the decoder permanently stores the last D Inter frames received (the value of D is preferably known to the coder and decoder, or alternatively the decoder can use a value Dmax).

If an P(k) Inter frame transmitted suffers a loss detected by the decoder, the latter immediately sends a negative acknowledgement NACK(k) and the coder continues the sending of the following frames including P(d) and P(t−D).

On reception of the NACK(k) corresponding to the time when the frame of number t is coded by the coder, the latter sends the I(t−D) Intra frame stored and, in the same cycle, transmits the same P(t) Inter frame. The coder then resumes its coding and the transmission of the frame t+1 and the following frames normally.

When the I(t−D) Intra frame is received, the decoder has an Inter frame and an Intra frame of the frame t−D, the P(t−D) frame already having been received by the decoder, as well as the Inter frames of t−D+1 to t. It is here accepted that it is not necessary to resend the P(t−D+1) to P(t) Inter frames. This is because the dissolving erases the errors of any quantizations on the gentle transition. It is therefore assumed here that the P frames according to the re-synchronization are sufficiently compatible with the reconstructed stream. The decoder thus has data necessary for implementing the slow re-synchronization process.

When the I(t−D) Intra frame is received, the decoder deletes the frames already decoded above t−D. The decoding with slow re-synchronization is initialized to the frame t−D.

The decoding principle is then similar to the principle described above with reference to FIGS. 7 and 8, modifying however the source of the re-synchronization Inter $P^1$(t−D+1) to $P^1$(t−d+N) frames that are stored in the decoder. The $P^2$(t−D) Inter frame allowing the propagation of the errors is the stored P(t−D) frame. It is preferable to re-decode the frames of t−D+N to t in order to avoid any transition defects and simplify the processing. When the slow re-synchronization has terminated, the decoding resumes normally on the transmitted frames, it being possible for the slow re-synchronization to continue after t as described previously with reference to FIGS. 7 and 8. This phase of reconstructing the slow re-synchronization between t−D and t must occur as quickly as possible (for example at a rate greater than 25 frames per second for a video stream at 25 frames per second) in order to catch up the delay caused by this readjustment on the past.

This implementation makes it possible to accelerate the refreshing and to limit the propagation of errors without additional cost with regard to the resources relating to transmission. However, it is necessary, to use it, for the coder to permanently store a chosen frame from the past of the coder (a frame not yet decoded or displayed by the decoder), that it can transmit to the decoder in the case of error signal. The decoder must be able to intercept this frame in its buffer memory immediately on reception in order to decode it immediately to put in place the slow re-synchronization process. It suffices for example, at the decoder, to use a storage of the received frames indexed by the number of frames (display time), instead of a conventional memory of the FIFO (First In First Out) type, without management of priority. If the time index of the Intra frame has already been processed, it is then a case of a re-synchronization that the decoder can and must implement. Finally, the decoder must also permanently store the D Inter frames P of its past in order to re-simulate the re-synchronization.

According to a third embodiment, the client uses an Intra frame following a degraded Inter frame to retrospectively predict a non-degraded corresponding Inter frame, these pairs of Inter frames then being combined to progressively reduce the effect of the degradation. FIG. 9 illustrates the general principle of this embodiment.

A video sequence comprising Inter and Intra frames is received and decoded by the client. For example, the client receives the P(t−3) Inter frame, then the P(t−2) Inter frame, the P(t−1) Inter frame, the I(t) Intra frame and then the P(t+1) Inter frame as illustrated. The P(t−3) Inter frame, referenced 900, here contains an area 902 symbolically representing an object of the video sequence. As illustrated, due to the motion linked to the video sequence, the area 902 changes position from one frame to the other.

The black rectangle 903 corresponds to a part of the frame lost on transmission. This part may be partially corrected or not. Due to the propagation of the error and the drift linked to the error and its propagation, the black rectangle 903 is transmitted to the following Inter frames, that is to say here to the P(t−2) and P(t−1) frames.

When the following Intra frame is received, that is to say here the I(t) frame referenced 901, the error disappears abruptly, as shown. To avoid an unpleasant visual effect, the I(t) frame is not displayed but it is used to progressively remove the error.

First of all, an estimation of the P(t−1) Inter frame, referenced 907 and denoted $\hat{P}$(t−1), is determined (step 905). The $\hat{P}$(t−1) frame is calculated on the basis of the I(t) Intra frame received by using the motion vectors associated with the received P(t−1) Inter frame. An example of an algorithm making it possible to calculate such an estimated frame is presented in the following portion of the present description.

It should be noted that as the $\hat{P}$(t−1) frame is determined on the basis of the I(t) frame, it does not contain the transmission error represented by the black rectangle 903 on the P(t−3) frame.

The difference between the P(t−1) and $\hat{P}$(t−1) frames, referenced 904 and 907, respectively, is next calculated (step 908) to obtain an estimation of the error, or of the drift of the error, linked to the transmission. The frame obtained by the calculation of the differences is referenced 910 and denoted $\hat{E}$(t−1) As the estimated $\hat{P}$(t−1) frame is not perfect, the difference between the P(t−1) and $\hat{P}$(t−1) frames is preferably only carried out in the part of the frame containing the error. This part may in particular be determined using a tracking algorithm applied to the P(t−2) and P(t−1) frames as described below.

As illustrated, the black rectangle 912 of the frame 910 represents the estimated error, that is to say the difference between the P(t−1) and $\hat{P}$(t−1) frames in the part containing the error, corresponding to the error represented by the black rectangle of the frame 904.

In this embodiment, the variation of the luminance due to the decoding error and to the refreshing of the Intra frame is estimated on the P(t−1) frame. This prediction leads to an error image (909). It is noted that it is also possible to estimate this error on the I(t) frame (901) by prediction of a $\hat{I}$(t) frame by projection in the direction of the motion of the P(t−1) frame at time t. This predicted frame contains the decoding error. The obtainment of the error image (equivalent to $\hat{E}$(t−1) at time t) is carried out by subtracting $\hat{I}$(t) from I(t), pixel by pixel.

The invention makes it possible to attenuate the elimination of a transmission error on reception of an Intra frame using a soft transition. To that end, the estimated error represented by the rectangle 912 is transferred into the received Intra frame and in the following ones while being attenuated over time (step 911). The results of this tracking and this attenuation are represented by the gray rectangles 913 and 914. The error represented by the rectangles 913 and 914 is transferred into the frames 901 and 915 (step 916), that is to say into the I(t) Intra frame and into the P(t+1) Inter frame, in order to form the frames 919 and 920 which can be displayed (step 917).

As illustrated by the frames 918, 919 and 920, the correction of the transmission error is carried out using a soft transition. In this example, the frame 918 corresponds to the frame 904. Although the soft transition is carried out here over three successive frames, it should be noted that in reality, this soft transition affects a greater number of frames, this number of frames depending in particular on the desires of the user and on the frequency of display of the frames.

Thus, the follow-up and attenuation of the errors makes it possible to avoid an abrupt correction of a video sequence, unpleasant for the user.

FIG. 10 schematically illustrates the processing operations used to implement the invention according to the third embodiment. A network interface is used to receive data from a network (step 1000), preferably in the form of packets.

The data contained in the received packets are extracted (step 1001) to form the bitstream 1002 of the video stream. A video decoder is then used (step 1003) to decompress the bitstream coming from the received data. It is assumed here that the video decoder is capable of spatially locating the errors in the received frames during the decoding. These errors come, in particular, from packet transmission problems.

Mapping of the positions of the errors detected is generated and kept up to date (step 1004). The mapping of the positions of the errors comprises the positions of new errors detected coming from the video decoder as well as the positions of the errors tracked over time. The tracking of the errors uses the motion vectors determined using Inter frames. With reference to FIG. 9, the mapping of the positions of the errors makes it possible to track the position of the black rectangle referenced 903.

If the frame in course of decoding is an Intra frame, an error image 1007 is generated (step 1006). The error image is for example the $\hat{E}(t-1)$ frame bearing the reference 909 in FIG. 9. The error image is used to track and attenuate the errors over time (step 1008). This step, corresponding to step 911 of FIG. 9, uses the motion vectors determined using the Inter frames. Simultaneously with the step of following and attenuation of the errors 1008, if errors are detected by the video decoder, these are transmitted to update the mapping of the positions of the errors (step 1004) and can be expected to be corrected by an error concealment module (not shown) situated at the video decoder, independently of the steps 1008 and 1009. The decoded frames 1005 coming from the video decoder are added together (step 1009) with the error image processed at step 1008. The result may then be displayed (step 1010). It should be noted here that for the Inter frames, step 1004 and steps 1006, 1007, 1008 and 1009 are executed in parallel.

FIG. 11 is a detailed representation of FIG. 10. The data are received from the network through a communication interface (step 1100), preferably in the form of data packets. As stated previously, the data contained in the received packets are extracted (step 1101) to form the bitstream 1102 of the coded video stream transmitted by the server. A video decoder is then used (step 1103) to decompress the bitstream coming from the received data and thus form a video frame 1105.

Simultaneously, the motion vectors 1104 of the decoded frame are determined and stored. The motion vectors are in particular used later for the tracking and attenuation of the detected errors.

Moreover, parallel to the decoding of the received frames, the position of the errors detected by the video decoder is determined (step 1106). These positions are transmitted to an error concealment module adapted to correct, at the video decoder, the transmission errors of the packets (step 1107).

Simultaneously, the reference frame 1116 corresponding to the position of the errors in a group of pictures is updated. The updating consists of tracking the preceding errors (steps 1114 and 1115) over time and of adding the new positions of the errors 1106 detected in the latest decoded frames (steps 1115 and 1119). The tracking module is detailed with respect to FIG. 12. The frame 1116 is reinitialized to zero when an Intra frame is received.

If the decoded frame is an Intra frame (step 1108), a scene analysis is carried out to detect a change of scene (step 1109). This step makes it possible to determine whether the analyzed frame is temporally correlated with the preceding one. If no change of scene has been detected, that is to say if there is a high spatial correlation between the analyzed frame and the previous frame, an error prediction is carried out (step 1110). This error prediction step, corresponding to step 1006 of FIG. 10, is detailed with reference to FIGS. 14 and 15. This step makes it possible to generate an estimation of the drift $\hat{E}(t-1)$ referenced 1111 (reference 909 of FIG. 9) also termed error image.

It is possible that, for certain Intra frames, the process 1110 cannot be executed. These particular cases correspond for example to the arrival of an Intra frame whereas no new error has been detected (1106) and when the process of tracking and attenuation of the errors (step 1112) has not yet converged to a frame close to zero.

Whatever the type of decoded frame 1105, a tracking of the errors is carried out on the error image 1111 over time, while attenuating those errors (steps 1112 and 1113). This tracking of errors is based on the motion vectors 1104. Step 1112, corresponding to step 911 of FIG. 9, is detailed with reference to FIG. 13.

The error image 1111 is added to the analyzed frame before the latter is displayed (steps 1117 and 1118).

It should be noted that step 1112 of tracking and attenuation of the errors and step 1117 of adding the error image to the analyzed frame are only applied to a limited number of frames. The estimation of the errors and of their drifts must disappear relatively rapidly to avoid an effect of abrupt change on display of an Intra frame. Consequently, the error image must preferably be reinitialized to zero regularly, for example every N frames, it being possible for N to correspond to ten or fifteen frames. N is advantageously less than the size of the groups of pictures.

FIG. 12 illustrates the tracking of the errors in the mapping of the positions of the errors. A frame 1200, termed $ELM_{t-1}$, corresponds to the mapping of the positions of the errors at the time t−1 (ELM being the acronym for Error Location Map). The grayed part 1201 of the frame 1200 corresponds to the positions of the accumulated errors determined between the last Intra frame received and the frame at the time t−1. The $ELM_{t-1}$, frame may thus be defined in the following manner, $$ELM_{t-1}(x, y) = \begin{Bmatrix} 0 & \text{white} \\ 1 & \text{gray} \end{Bmatrix}$$

The frame 1206, termed $ELM_t$, corresponds to the mapping of the positions of the errors, in course of being produced, at the time t. Some of the motion vectors, determined on the basis of the Inter frame received at time t on its decoding, are illustrated by the references 1204 and 1205. The reference 1204 characterizes the motion vector according to which the position of the block 1208 of the frame 1206 corresponds to the position of the block 1202 of the frame 1200. Similarly, the reference 1205 characterizes the motion vector according to which the position of the block 1207 of the frame 1206 corresponds to the position of the block 1203 of the frame 1200.

It should be recalled here that, when an Inter frame is received, a motion vector is determined for each block of that frame. The motion vectors come from the coded representation of the frame in course of analysis. These motion vectors are used to predict each block of the frame in course of analysis on the basis of the blocks of the preceding frame.

The invention uses the information given by the motion vectors used in the coding of the Inter frames to track the position of the errors.

First of all, all the pixels (acronym for Picture Elements) of the ELM$_t$ frame are initialized to zero. Next, all the blocks of the ELM$_t$ frame are processed.

If the block 1207 is considered of the frame 1206 representing the mapping of the positions of the errors ELM$_t$ at the time t, the motion vector 1205 associated with that block is selected. The motion vector 1205 makes it possible to determine the block corresponding to the block 1207 in the preceding frame, that is to say the block 1203 in the ELM$_{t-1}$ frame. The position of the block 1203 is determined according to the following relationship, $$(x_{t-1}, y_{t-1}) = (x_t + v_x, y_t + v_y)$$

in which $(x_{t-1}, y_{t-1})$ represents the coordinates of the center of the block 1203, $(x_t, y_t)$ represents the coordinates of the center of the block 1207 and $(v_x, v_y)$ represents the components of the motion vector associated with the block 1207, that is to say the motion vector 1205.

The values of the pixels of the block 1203 are then reproduced in the block 1207.

Similarly, it is possible to determine the position of the block 1202 of the ELM$_{t-1}$ frame on the basis of the position of the block 1208 of the ELM$_t$ frame and of the motion vector 1204 associated with that block. In the same way, the values of the pixels of the block 1202 then reproduced in the block 1208.

All the blocks of the ELM$_t$ frame are thus processed. This makes it possible to track the positions of the accumulated errors. Like the ELM$_{t-1}$ frame, the ELM$_t$ frame is defined in the following manner, $$ELM_{t-1}(x, y) = \begin{cases} 0 & \text{white} \\ 1 & \text{gray} \end{cases}$$

where the gray represents positions corresponding to errors and where the white corresponds to correctly decoded areas.

As mentioned earlier, with reference to step 1119 of FIG. 11, the positions of the errors identified by the decoder must be added to the positions determined by the error tracking mechanism. In FIG. 12, the positions of the errors 1210 identified by the decoder are stored in a frame referenced 1209. This frame is added, pixel by pixel, to the frame 1206 representing the positions determined by the error tracking mechanism (step 1211). It should be noted here that the addition may be considered as a logical OR.

The result of this addition is the frame 1212 which corresponds to the mapping of the positions of the errors at time t, that is to say to the ELM$_t$ frame.

FIG. 13 illustrates the step 1112 of tracking and attenuating the errors illustrated in FIG. 11. The frame 1300 corresponds to the error image at the time t−1, also termed EM$_{t-1}$: this is the prediction error, referenced 909 in FIG. 9, followed over time. The manner of calculating the error image on reception of an Intra frame is explained in more detail with reference to FIG. 15. It is shown here how this error image is followed and attenuated over time. The white areas correspond here to the areas in which no error has been identified whereas the gray areas 1301 correspond to the areas in which errors have been identified. Even if the gray areas are represented by a single color for considerations of simplicity, they may take any value.

The object of the principle of tracking, similar to that presented earlier with reference to FIG. 12, is to determine an error frame EM$_t$ at the time t. The frame 1306 represents the error frame EM$_t$ in course of evaluation whereas the frame 1310 represents the error frame EM$_t$ at the end of evaluation.

All the pixels of the frame 1306 are first of all initialized to zero.

As with regard to the coded representation of the frame in course of decoding, the frame 1306 is decomposed into blocks according to the same partitioning as that carried out by the video coder. A motion vector is associated with each block of the frame in course of decoding.

If the frame in course of decoding is a frame of Intra type, the motion vectors are determined in the manner presented below, with reference to FIG. 14.

The motion vectors associated with the blocks of the frame 1306 representing the error image at the time t, coming from the frame in course of decoding, make it possible to determine corresponding blocks in the frame 1300 representing the error image at the time t−1. Thus, for each block of the frame EM$_t$ a block of the frame EM$_{t-1}$ is associated with it. For example, the motion vector 1304 makes it possible to associate the block 1302 of the frame 1300 with the block 1308 of the frame 1306. Similarly, the motion vector 1305 makes it possible to associate the block 1303 of the frame 1300 with the block 1307 of the frame 1306.

The content of each block of the frame 1306 is replaced by the content of the block which is associated with it in the frame 1300. All the blocks of the frame 1306 are thus processed in order to determine a value for each pixel of the frame 1306.

When the tracking step is carried out, a step of attenuation 1309 is performed. For this, the value of each pixel of the frame 1306 is multiplied by a coefficient α in the following manner, $$EM_t(x,y) = \alpha.EM_t(x,y)$$

The value of the coefficient α is determined in such a way that it enables transitions between frames containing errors and frames not containing any, or not containing any at the same locations, that is to say in particular between the Inter frames and an Intra frame. The transition is advantageously carried out over a period less than that defined by two consecutive Intra frames. If an Intra frame is received every N frames, it being possible for N to correspond to ten or fifteen frames, the transition must preferably be carried out over N frames. In other words, if an Intra frame is received at the time t, the transition must be terminated at the time t+N−1. If the period between two consecutive Intra frames is long, for example greater than 25, then it is preferably considered that the transition period must not exceed 12 frames.

To determine the value of the coefficient α a variable AF may be used. The value of the variable AF is initialized to the value N at each reception of an Intra frame and the value AF is decremented by one at each reception of a frame. The value of the coefficient αx may then be determined according to the following relationship, $$\alpha = \frac{AF - 1}{AF}$$

If the value of the coefficient α is negative, the value of the coefficient α is fixed at zero and the method of error tracking and attenuation is stopped. The transition is considered as having ended.

If the frame in course of decoding is an Intra frame, no motion vector is associated with each block of that frame. It is thus necessary in this case to determine the motion vectors associated with each block of the frame in course of being processed.

Even though it is alternatively possible to calculate $\hat{E}(t)$ and not $\hat{E}(t-1)$ to avoid this problem, this solution necessitates the prediction of the I(t) frame instead of the P(t−1) frame and, consequently, the same problem arises. It should be noted here that, if $\hat{E}(t)$ is calculated, the error is then estimated by the comparison of the I(t) Intra frame and the $\hat{P}(t)$ Inter frame predicted from the P(t−1) Inter frame and from the motion vectors.

FIG. 14 illustrates the manner in which a field of vectors may be determined in relation with an Intra frame. The frame 1400 is here a symbolic representation of the P(t−1) Inter frame as represented in FIG. 9. It is considered that this frame is divided into blocks, in the same manner as that used by the video coder, and that a motion vector is associated with each of those blocks. The motion vectors come from the coded representation of the P(t−1) Inter frame. The field of vectors is projected (step 1401) onto the frame 1402 in the following manner: by considering a block of the P(t−1) Inter frame whose coordinates of the center are (x,y) and the motion vector $(v_x, v_y)$, the projection is characterized by the same motion vector and by the block comprising the point of which the coordinates are, $$(x', y') = (x - v_x, y - v_y)$$

where the frame 1402 is also divided into blocks according to the same partitioning Thus, for example, the projection of the block 1405 of the frame 1400 enables the block 1406 to be obtained. The block comprising the center of the block 1406 is the block 1407. The motion vector associated with the block 1405 is next reproduced and associated with the block 1407.

Such a projection is advantageously carried out for all the blocks of the frame 1400.

The object of step 1403 is next to determine by interpolation a motion vector for each block of the frame 1402 to which no motion vector has been associated during the projection. An example of interpolation consists of applying a median filter to the motion vectors obtained by projection. For example, each block of the frame 1402 is considered as a pixel. The frame 1402 is thus considered, for the application of the median filter, as a frame of vectors in two dimensions. With each pixel there corresponds a motion vector in two dimensions. If no motion vector has been attributed to the block by the process 1401 then the motion vector is considered as null. The median filtering consists of centering a grid, for example of dimension 5×5, on a pixel and of taking the median value of the 25 pixels of the frame 1402 which are encompassed by the grid. As the frame 1402 is here composed of vectors in two dimensions, the median value applies to each component.

The frame 1404 obtained comprises the motion vectors associated with each block of the I(t) Intra frame following a P(t−1) Inter frame of which the motion vectors are known.

Naturally, there are other methods for obtaining the motion vectors associated with an Intra frame.

FIG. 15 illustrates step 1006 of FIG. 10 or 1110 of FIG. 11 of generating an error image. This step corresponds to the step of evaluating the difference, termed $\hat{E}(t-1)$ and referenced 909 in FIG. 9, between the P(t−1) Inter frame and the estimation $\hat{P}(t-1)$ of that frame.

The frame 1500 is a symbolic representation of the P(t−1) Inter frame. The frame 1500 is here divided into blocks according to the same partitioning as that carried out by the video coder. A motion vector is associated with each block. The motion vectors 1502, corresponding to the vectors determined by the video coder, are extracted during the decoding of the P(t−1) Inter frame.

The frame 1501 is a representation of the decoded I(t) Intra frame. The frame 1507 represents the mapping of the positions of the errors at the time t−1, also termed $ELM_{t-1}$. The grayed area 1508 represents the position of the tracked errors, as explained with reference to FIG. 12, whereas the white area corresponds to the area in which no error has been detected. The following notation may be used to characterize the position of the errors, $$ELM_{t-1} = \begin{Bmatrix} 0 & \text{white} \\ 1 & \text{gray} \end{Bmatrix}$$

Step 1503 consists of a projection making it possible to determine an estimation $\hat{P}(t-1)$, referenced 1504, of the P(t−1) Inter frame. The value of each pixel of coordinates (x,y) of the frame 1504 is estimated according to the following relationship.

$$\hat{P}(t-1)(x, y) = \begin{Bmatrix} I(t)(x - v_x, y - v_y) & \text{if } ELM_{t-1}(x, y) = 1 \\ \gamma & \text{if } ELM_{t-1}(x, y) = 0 \end{Bmatrix}$$

where γ is a particular value, for example γ is equal to 1000.

In this relationship, the motion vector $(v_x, v_y)$ is the motion vector determined for the P(t−1) Inter frame with the coordinates (x,y). If the pixel with coordinates (x,y) is situated in a block B, the motion vector associated with that block B is attributed to the pixel with coordinates (x,y).

When the estimation $\hat{P}(t-1)$ has been calculated, the difference $\hat{E}(t-1)$ between the P(t−1) Inter frame and the estimation $\hat{P}(t-1)$ of that frame is determined (step 1505).

$$\hat{E}(t-1)(x,y) = P(t-1)(x,y) - \hat{P}(t-1)(x,y)$$

The difference is only calculated if $\hat{P}(t-1)(x,y)$ is different from γ. If $\hat{P}(t-1)(x,y)$ is equal to γ then $\hat{E}(t-1)(x,y)$ is equal to zero.

FIG. 16 represents an alternative to the method described by reference to FIG. 12 for tracking the errors in the mapping of the positions of the errors in order to improve the transition between frames containing errors and frames not containing any error or containing different errors.

According to FIG. 12, the position of the errors determined in the frame 1206 is added to the frame 1209 representing the position of the tracked errors.

As was shown previously, the slow transition which follows the taking into account of an Intra frame necessitates the estimation of the difference $\hat{E}(t-1)$ between the P(t−1) Inter frame and the estimation $\hat{P}(t-1)$ of that frame. However, if the prediction $\hat{P}(t-1)$ of the P(t−1) frame is poor, the difference $\hat{E}(t-1)$ on which the tracking and attenuation of the errors is carried out for the following frames risks introducing artefacts not corresponding to poor error concealments but which arise from a poor prediction. The object of the alternative illustrated by FIG. 16 is to reduce that risk.

The solution consists here of adding (reference 1211 of FIG. 12) the position of the detected errors (frame 1209 of FIG. 12) only if the error concealment mechanism is ineffective.

The decoded frame 1600 comprises a part in which the data have been lost. By way of illustration, the part in which the data have been lost is divided into four areas 1601, 1602, 1603 and 1604. An error concealment mechanism is applied to each of these areas.

The quality of the error concealment is then evaluated for each of the areas (step 1605). For example, the regularity of the motion between the consecutive frames may be used to determine the quality of the error concealment. If the motion is considered regular over the preceding frames, it may then be considered that the error concealment procedure is of good quality. On the contrary, if the motion over the preceding frames is practically random, it may be considered that the error concealment procedure is not effective.

In the example presented in FIG. 16, it is considered that the quality of the error concealment is good for the areas 1602 and 1604. Consequently, these areas will not be at the origin of an abrupt transition on display of a following Intra frame. However, it is considered here that the error concealment quality is not satisfactory for the areas 1601 and 1603. These areas thus risk being at the origin of an abrupt transition on display of a following Intra frame.

The error image is thus modified to take into account the positions of the errors of which the concealment is not satisfactory. Thus, in FIG. 12 and according to the mechanism illustrated with reference to FIG. 16, the frame 1209 no longer represents all the detected errors but only the errors detected for which the concealment quality is not satisfactory, as illustrated in frame 1606 by the areas 1607.

A solution to evaluate the quality of concealment of the errors consists of determining whether the continuity between the areas corresponding to the non-concealed errors and the areas corresponding to the concealed errors is satisfied or not.

In a variant embodiment, the quality of the prediction of $\hat{P}(t-1)$ is first of all evaluated to determine the parts for which the prediction is good. If it is determined that the prediction cannot be made satisfactorily in certain parts of the area in which the concealment is applied, those parts are excluded from the error image.

Naturally, to satisfy specific needs, a person skilled in the art will be able to make amendments to the preceding description.

The invention claimed is:

1. A method of concealment of at least one decoding error induced by at least one transmission error, in a multimedia sequence transmitted over a network between a server and a client, the method comprising:
    obtaining, after having detected said at least one transmission error, a synchronized stream linked to said multimedia sequence, said synchronized stream comprising refresh data;
    determining characteristic data of said at least one decoding error;
    creating a non-synchronized stream linked to said multimedia sequence, said characteristic data being propagated in said non-synchronized stream; and
    creating a resulting stream according to a function of said synchronized stream and said characteristic data, wherein at least one of the characteristic data is propagated such that the influence of the at least one of said characteristic data in said function diminishes progressively for a given image position with time.

2. A method according to claim 1, in which the influence of said at least one of said characteristic data, in said function, progressively diminishes with time starting with an element of said synchronized stream comprising said refresh data.

3. A method according to claim 1, in which a negative acknowledgement is transmitted from said client to said server on detection of said at least one transmission error.

4. A method according to claim 1 in which said resulting stream is created according to a weighted mean of said synchronized and non-synchronized streams.

5. A method according to claim 1 wherein said multimedia sequence is coded according to a hybrid coding operation of reducing spatial and temporal redundancies, said synchronized stream being based on coded data according to spatial redundancies and said characteristic data being propagated in said non-synchronized stream through coded data according to temporal redundancies.

6. A method according to claim 1, in which said method is implemented in said server, said method also comprising a step of receiving location information of said at least one decoding error.

7. A method according to claim 6, further wherein the step of propagating said characteristic data is performed according to said received location information.

8. A method according to claim 7, in which the creation of said non-synchronized stream is based on reference data, said reference data being determined according to said step of propagating said characteristic data.

9. A method according to claim 7 further comprising steps of coding and transmitting said resulting stream.

10. A method according to claim 9, in which the coding of said resulting stream is based on reference data and on the result of said function of said synchronized and non-synchronized streams, said reference data being determined according to said step of propagating said characteristic data.

11. A method according to any one of claims 1 and 3 to 5, in which said method is implemented in said client.

12. A method according to claim 11, further comprising a step of receiving data to propagate said characteristic data.

13. A method according to claim 11 in which reference data are used for determining the data of said non-synchronized stream at a given moment, said reference data being the data of said resulting stream at the previous moment.

14. A method according to claim 1 further comprising a step of concealment of said at least one decoding error in said non-synchronized stream, said concealment step being implemented in said client and in said server, the concealment step implemented in the server having same effects as the concealment step carried out in the client.

15. A method according to claim 1 wherein said step of determining characteristic data comprises a step of estimating said at least one decoding error, said characteristic data comprising said estimation of said at least one decoding error.

16. A method according to claim 15, in which said step of estimating said at least one decoding error comprises:
    predicting an element of said multimedia sequence, termed non-erroneous element, on the basis of an element of said synchronized stream comprising at least one of said refresh data; and,
    comparing said non-erroneous element with the corresponding decoded element, termed erroneous element, said erroneous element comprising said at least one decoding error.

17. A method according to claim 15, in which said step of estimating said at least one decoding error comprises:
    predicting an element of said multimedia sequence, termed erroneous element, on the basis of an element comprising said at least one decoding error; and,
    comparing said erroneous element with the corresponding element of said synchronized stream, termed non-erroneous element, said non-erroneous element comprising said at least one of said refresh data.

18. A method according to claim 16, further comprising a step of evaluating the quality of said prediction.

19. A method according to claim 15 in which said characteristic data comprise an item of information representing the propagation of said at least one decoding error in the multimedia sequence.

20. A method according to claim 19, in which said resulting stream is created by transferring said estimation of said at least one decoding error into said synchronized stream, the influence of said estimation of said at least one decoding error diminishing progressively with time.

21. A method according to claim 20, in which said estimation of said at least one decoding error is transferred into only a part of at least one element of said synchronized stream, said part being determined on the basis of said item of information representing the propagation of said at least one decoding error in said multimedia sequence.

22. A method according to claim 15 comprising a prior step of concealment of said at least one decoding error and a step of evaluating the quality of concealment resulting from said prior step of concealment, said step of determining characteristic data and creating a resulting stream being implemented in response to the comparison of said estimated quality with a predetermined threshold.

23. A method according to any one of claims 1, 20 and 21 wherein said multimedia sequence comprises a video sequence, an audio sequence or an audio video sequence.

24. A non-transitory computer-readable storage medium for storing a computer program of concealment of at least one decoding error induced by at least one transmission error, in a multimedia sequence transmitted over a network between a server and a client, that can be loaded into a computer system, the computer program comprising instructions executable by a processor for carrying out each of the steps of the method according to any one of the claims 1, 20 and 21.

25. A device for concealment of at least one decoding error induced by at least one transmission error, in a multimedia sequence transmitted over a network between a server and a client, the device comprising:
   means for obtaining, after having detected said at least one error, a synchronized stream linked to said multimedia sequence, said synchronized stream comprising refresh data;
   means for determining characteristic data of said at least one decoding error;
   means for creating a non-synchronized stream linked to said multimedia sequence, said characteristic data being propagated in said non-synchronized stream; and
   means for generating a resulting stream according to a function of said synchronized stream and said characteristic data, wherein at least one of said characteristic data is propagated such that the influence of the at least one of said characteristic data in the function diminishes progressively for a given image position with time.

26. A device according claim 25 in which said means for generating said synchronized stream comprise a coder.

27. A device according to claim 25 in which said means for generating said non-synchronized stream comprise a decoder.

28. A device according to claim 25 further comprising coding means adapted to code said resulting stream.

29. A device according to claim 25 in which said means for generating said synchronized stream comprise a decoder.

30. A device according to claim 25, further comprising means for receiving two distinct streams in parallel.

31. A device according to claim 25, further comprising means for estimating said at least one decoding error.

32. A device according to claim 31 further comprising means for predicting an element of said multimedia sequence, that is prior to the detection of said at least one transmission error, on the basis of said synchronized stream.

33. A device according to claim 31, further comprising means for predicting an element of said multimedia sequence, that is subsequent to the reception of said refresh data, said element comprising said at least one decoding error.

34. A device according to claim 32 further comprising means for comparing said predicted element and corresponding decoded element.

35. A device according to claim 31 further comprising means for estimating a level of quality of said predicted element.

36. A device according to claim 31, further comprising:
   means for concealment of said at least one decoding error; and,
   means for evaluating the quality of said concealment.

37. A server comprising a device for concealment of at least one decoding error induced by at least one transmission error, in a multimedia sequence transmitted over a network between a server and a client, the device comprising:
   means for obtaining, after having detected said at least one error, a synchronized stream linked to said multimedia sequence, said synchronized stream comprising refresh data;
   means for determining characteristic data of said at least one decoding error;
   means for creating a non-synchronized stream linked to said multimedia sequence, said characteristic data being propagated in said non-synchronized stream; and
   means for generating a resulting stream according to a function of said synchronized stream and said characteristic data, wherein at least one of said characteristic data is propagated such that the influence of the at least one of said characteristic data in the function diminishes progressively at a given image position with time.

* * * * *